US012198705B2

(12) United States Patent
Fotopoulou et al.

(10) Patent No.: US 12,198,705 B2
(45) **Date of Patent: *Jan. 14, 2025**

(54) APPARATUS, METHOD OR COMPUTER PROGRAM FOR ESTIMATING AN INTER-CHANNEL TIME DIFFERENCE

(71) Applicant: Fraunhofer-Gesellschaft zur Förderung der angewandten Forschung e.V., Munich (DE)

(72) Inventors: Eleni Fotopoulou, Erlangen (DE); Jan Büthe, Erlangen (DE); Emmanuel Ravelli, Erlangen (DE); Pallavi Maben, Erlangen (DE); Martin Dietz, Erlangen (DE); Franz Reutelhuber, Erlangen (DE); Stefan Döhla, Erlangen (DE); Srikanth Korse, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,932

(22) Filed: Jan. 26, 2023

(65) Prior Publication Data

US 2023/0169985 A1 Jun. 1, 2023

Related U.S. Application Data

(63) Continuation of application No. 17/036,261, filed on Sep. 29, 2020, now Pat. No. 11,594,231, which is a (Continued)

(30) Foreign Application Priority Data

Apr. 5, 2018 (EP) .................................... 18165882

(51) Int. Cl.
*G10L 19/008* (2013.01)
*G10L 21/0216* (2013.01)
(Continued)

(52) U.S. Cl.
CPC ............ *G10L 19/008* (2013.01); *G10L 25/06* (2013.01)

(58) Field of Classification Search
CPC ............... G10L 19/008; G10L 19/0208; G10L 19/02; G10L 19/0204; G10L 19/06; G10L 19/04;
(Continued)

(56) References Cited

U.S. PATENT DOCUMENTS

| | | | |
|---|---|---|---|
| 5,434,948 | A | 7/1995 | Holt et al. |
| 7,720,230 | B2 | 5/2010 | Allamanche et al. |

(Continued)

FOREIGN PATENT DOCUMENTS

| | | | |
|---|---|---|---|
| CN | 101809655 | A | 8/2010 |
| CN | 106796792 | A | 5/2017 |

(Continued)

OTHER PUBLICATIONS

Masanori et al, "TDOA Estimation Based on Phase-Voting Cross Correlation and Circular Standard Deviation", 25th European Signal Processing Conference EUSIPCO, pp. 1230-1234 (Year: 2017).*

(Continued)

*Primary Examiner* — Leshui Zhang
(74) *Attorney, Agent, or Firm* — McClure, Qualey & Rodack, LLP

(57) ABSTRACT

An apparatus for estimating an inter-channel time difference between a first channel signal and a second channel signal, includes a signal analyzer for estimating a signal characteristic of the first channel signal or the second channel signal or both signals or a signal derived from the first channel signal or the second channel signal; a calculator for calcu-
(Continued)

lating a cross-correlation spectrum for a time block from the first channel signal in the time block and the second channel signal in the time block; a weighter for weighting a smoothed or non-smoothed cross-correlation spectrum to obtain a weighted cross correlation spectrum using a first weighting procedure or using a second weighting procedure depending on a signal characteristic estimated by the signal analyzer, wherein the first weighting procedure is different from the second weighting procedure; and a processor for processing the weighted cross-correlation spectrum to obtain the inter-channel time difference.

15 Claims, 25 Drawing Sheets

Related U.S. Application Data continuation of application No. PCT/EP2019/058434, filed on Apr. 3, 2019.

(51) Int. Cl.
*G10L 25/06* (2013.01)
*G10L 25/18* (2013.01)

(58) Field of Classification Search
CPC ....... G10L 19/08; G10L 19/032; G10L 19/00; G10L 19/167; G10L 19/025; G10L 25/06; G10L 21/0216; G10L 25/18; H04R 5/04
USPC ....... 704/226, 224, 225, 205, 206, 207, 209; 381/1–23
See application file for complete search history.

(56) References Cited

U.S. PATENT DOCUMENTS

| | | | |
|---|---|---|---|
| 8,280,744 B2 | 10/2012 | Hellmuth et al. | |
| 8,811,621 B2 | 8/2014 | Schuijers | |
| 2011/0085671 A1 | 4/2011 | Gibbs | |
| 2011/0206209 A1 | 8/2011 | Ojala | |
| 2011/0288872 A1 | 11/2011 | Liu et al. | |
| 2012/0002818 A1 | 1/2012 | Heiko et al. | |
| 2012/0016632 A1 | 1/2012 | Wu et al. | |
| 2012/0300945 A1 | 11/2012 | Wu et al. | |
| 2013/0182852 A1 | 7/2013 | Thompson et al. | |
| 2013/0301835 A1* | 11/2013 | Briand | H04S 7/00 381/17 |
| 2014/0164001 A1 | 6/2014 | Lang et al. | |
| 2015/0221313 A1 | 8/2015 | Purnhagen et al. | |
| 2016/0198279 A1 | 7/2016 | Briand et al. | |
| 2017/0133034 A1 | 5/2017 | Uhle et al. | |
| 2018/0322884 A1 | 11/2018 | Bayer et al. | |
| 2019/0189134 A1 | 6/2019 | Li et al. | |

FOREIGN PATENT DOCUMENTS

| | | | |
|---|---|---|---|
| JP | 2013-097273 A | 5/2013 |
| KR | 10-2013-0095851 A | 8/2013 |
| KR | 10-2018-0012829 A | 2/2018 |
| WO | 2006089570 A1 | 8/2006 |
| WO | 2017/125559 A1 | 7/2017 |
| WO | 2017125563 A1 | 7/2017 |
| WO | 2018028171 A1 | 2/2018 |

OTHER PUBLICATIONS

Korean language office action dated Apr. 10, 2023, issued in application No. KR 10-2020-7031943.

Fatus, B.; "Parametric Coding for Spatial Audio; "Master's Thesis, KTH; Dec. 2015; pp. 1-70.

ETSI TS 103 190-2 V1.1.1; "Digital Audio Compression (AC-4) Standard Part 2: Immersive and personalized audio;" Sep. 2015; pp. 1-205.

C. Knapp et al.: "The generalized correlation method for estimation of time delay." IEEE Transactions on Acoustics, Speech, and Signal Processing 24.4 (1976): 320-327.

C. Zhang et al.: "Why does PHAT work well in low-noise, reverberative environments?" Acoustics, Speech and Signal Processing, 2008. ICASSP 2008. IEEE International Conference on. IEEE, 2008.

D. V. Rabinkin et al.: "DSP implementation of source location using microphone arrays." Advanced signal processing algorithms, architectures, and implementations VI. vol. 2846. International Society for Optics and Photonics, Oct. 22, 1996.

M. Shen et al.: "A modified cross power-spectrum phase method based on microphone array for acoustic source localization." Systems, Man and Cybernetics, 2009. SMC 2009. IEEE International Conference on. IEEE, Oct. 11, 2009 (Oct. 11, 2009), pp. 1286-1291, XP031574559.

3GPP TS 26.445 V14.2.0; Codec for Enhanced Voice Services (EVS); Detailed algorithmic description; pp. 52-72 'relevant clauses are 5.1.11 "Background Noise Estimation" (p. 52-68) and 5.1.12.1 "SAD1 Module" (p. 69-72).

C. Faller: "Parametric Joint-Coding of Audio Sources", Audio Engineering Society the 120th Conven, AES, US, vol. 2, May 20, 2006 (May 20, 2006), pp. 2-3, XP008106236.

International Search Report and Written Opinion, dated 2019-08-13 from PCT/EP2019/058434.

Charles et al "The Generalized Correlation Method for Estimation of Time Delay", IEEE Trans. On Acoustics, Speech, and Signal Processing, vol. ASSP-24, No. 4, p. 320-327, (Aug. 1976).

Shen et al "A Modified Cross Power-Spectrum Phase Method Based on Microphone Array for Acoustic Source Localization", Proc. of 2009 IEEE International Conf. on Systems, Man, and Cybernetics, San Antonio, TX, USA, p. 1286-1291, (Oct. 2009).

Baumgarte et al "Binaural Cue Coding—Part 1: Psychoacoustic Fundamentals and Design Principles", IEEE Trans. on Speech and Audio Processing, vol. 11, No. 6, p. 509-519, (Nov. 2003).

Chinese language office action dated Apr. 19, 2023, issued in application No. CN 201980037464.0.

* cited by examiner

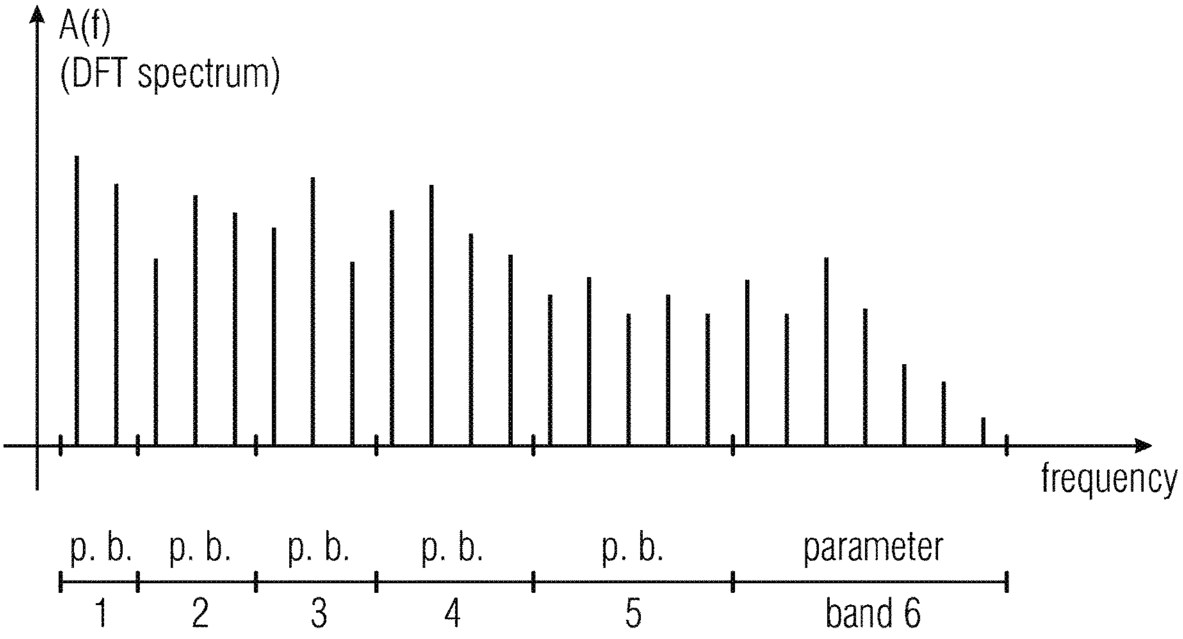

- single broadband alignment parameter for whole spectrum (e. g. p. band 1 to p. band 6);
- plurality of narrowband alignment parameters for parameter bands 1, 2, 3, 4, i. e., four narrowband parameters;
- level parameters for each parameter band, e. g. 6 level parameters;
- stereo filling parameters for parameter bands 4, 5, 6, e. g. three stereo filling parameters;
- side (residual) signal for parameter bands 1, 2, 3;
- more spectral lines in higher band, e.g. seven spectral lines in parameter band 6 versus three spectral lines in parameter band 2.

Fig. 3

ITD estimation

| parameters | bits/band | number of bands | bit-rate |
|---|---|---|---|
| ILD | 5 | all 12 bands | 3.00 kbps |
| IPD | 3 | up to 2.5 kHz | 1.05 kbps |
| ITD | 8 | whole spectrum | 0.6 kbps |
| stereo filling | 3 | from 1 kHz | 0.9 kbps |
| total | | | -5 kbps |

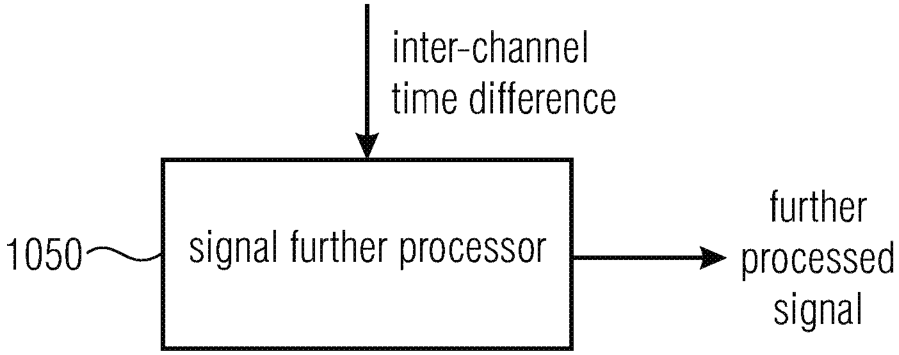

— storage/transmission of parametric data

— stereo/multi-channel processing/encoding

— time alignment of two channels

— time difference of arrival estimation for determination of speaker position in room with two microphones and known microphone setup — beamforming — spatial filtering — foreground/background decomposition — location of sound source e. g. by acoustic triangulation based on time differences of two/three signals

Fig. 10b

APPARATUS, METHOD OR COMPUTER PROGRAM FOR ESTIMATING AN INTER-CHANNEL TIME DIFFERENCE

CROSS-REFERENCES TO RELATED APPLICATIONS

This application is a continuation of U.S. patent application Ser. No. 17/036,261, filed Sep. 29, 2020, now U.S. Pat. No. 11,594,231, which is incorporated herein by reference in its entirety, which in turn is a continuation of International Application No. PCT/EP2019/058434, filed Apr. 3, 2019, which is incorporated herein by reference in its entirety, and additionally claims priority from European Application No. EP 18 165 882.4, filed Apr. 5, 2018, which is incorporated herein by reference in its entirety.

The present application is related to stereo processing or, generally, multi-channel processing, where a multi-channel signal has two channels such as a left channel and a right channel in the case of a stereo signal or more than two channels, such as three, four, five or any other number of channels.

BACKGROUND OF THE INVENTION

Stereo speech and particularly conversational stereo speech has received much less scientific attention than storage and broadcasting of stereophonic music. Indeed in speech communications monophonic transmission is still nowadays mostly used. However with the increase of network bandwidth and capacity, it is envisioned that communications based on stereophonic technologies will become more popular and bring a better listening experience.

Efficient coding of stereophonic audio material has been for a long time studied in perceptual audio coding of music for efficient storage or broadcasting. At high bitrates, where waveform preserving is crucial, sum-difference stereo, known as mid/side (M/S) stereo, has been employed for a long time. For low bit-rates, intensity stereo and more recently parametric stereo coding has been introduced. The latest technique was adopted in different standards as HeAACv2 and Mpeg USAC. It generates a down-mix of the two-channel signal and associates compact spatial side information.

Joint stereo coding are usually built over a high frequency resolution, i.e. low time resolution, time-frequency transformation of the signal and is then not compatible to low delay and time domain processing performed in most speech coders. Moreover the engendered bit-rate is usually high.

On the other hand, parametric stereo employs an extra filter-bank positioned in the front-end of the encoder as pre-processor and in the back-end of the decoder as post-processor. Therefore, parametric stereo can be used with conventional speech coders like ACELP as it is done in MPEG USAC. Moreover, the parametrization of the auditory scene can be achieved with minimum amount of side information, which is suitable for low bit-rates. However, parametric stereo is as for example in MPEG USAC not specifically designed for low delay and does not deliver consistent quality for different conversational scenarios. In conventional parametric representation of the spatial scene, the width of the stereo image is artificially reproduced by a decorrelator applied on the two synthesized channels and controlled by Inter-channel Coherence (ICs) parameters computed and transmitted by the encoder. For most stereo speech, this way of widening the stereo image is not appropriate for recreating the natural ambience of speech which is a pretty direct sound since it is produced by a single source located at a specific position in the space (with sometimes some reverberation from the room). By contrast, music instruments have much more natural width than speech, which can be better imitated by decorrelating the channels.

Problems also occur when speech is recorded with non-coincident microphones, like in A-B configuration when microphones are distant from each other or for binaural recording or rendering. Those scenarios can be envisioned for capturing speech in teleconferences or for creating a virtually auditory scene with distant speakers in the multi-point control unit (MCU). The time of arrival of the signal is then different from one channel to the other unlike recordings done on coincident microphones like X-Y (intensity recording) or M-S (Mid-Side recording). The computation of the coherence of such non time-aligned two channels can then be wrongly estimated which makes the artificial ambience synthesis fail.

References from known technology related to stereo processing are U.S. Pat. No. 5,434,948 or U.S. Pat. No. 8,811,621.

Document WO 2006/089570 A1 discloses a near-transparent or transparent multichannel encoder/decoder scheme. A multi-channel encoder/decoder scheme additionally generates a waveform-type residual signal. This residual signal is transmitted together with one or more multi-channel parameters to a decoder. In contrast to a purely parametric multi-channel decoder, the enhanced decoder generates a multi-channel output signal having an improved output quality because of the additional residual signal. On the encoder-side, a left channel and a right channel are both filtered by an analysis filterbank. Then, for each subband signal, an alignment value and a gain value are calculated for a subband. Such an alignment is then performed before further processing. On the decoder-side, a de-alignment and a gain processing is performed and the corresponding signals are then synthesized by a synthesis filterbank in order to generate a decoded left signal and a decoded right signal.

In such stereo processing applications, the calculation of an inter-channel or inter channel time difference between a first channel signal and a second channel signal is useful in order to typically perform a broadband time alignment procedure. However, other applications do exist for the usage of an inter-channel time difference between a first channel and a second channel, where these applications are in storage or transmission of parametric data, stereo/multi-channel processing comprising a time alignment of two channels, a time difference of arrival estimation for a determination of a speaker position in a room, beamforming spatial filtering, foreground/background decomposition or the location of a sound source by, for example, acoustic triangulation in order to only name a few.

For all such applications, an efficient, accurate and robust determination of an interchannel time difference between a first and a second channel signal may be used.

There do already exist such determinations known under the term "GCC-PHAT" or, stated differently, generalized cross-correlation phase transform. Typically, a cross-correlation spectrum is calculated between the two channel signals and, then, a weighting function is applied to the cross-correlation spectrum for obtaining a so-called generalized cross-correlation spectrum before performing an inverse spectral transform such as an inverse DFT to the generalized cross-correlation spectrum in order to find a time-domain representation. This time-domain representation represents values for certain time lags and the highest peak of the time-domain representation then typically corresponds to the time delay or time difference, i.e., the inter-channel time delay of difference between the two channel signals.

However, it has been shown that, particularly in signals that are different from, for example, clean speech without any reverberation or background noise, the robustness of this general technique is not optimum.

SUMMARY

According to an embodiment, an apparatus for estimating an inter-channel time difference between a first channel signal and a second channel signal of a stereo signal or a multi-channel signal having more channels than the first channel and the second channel may have: a signal analyzer for estimating a signal characteristic of the first channel signal or the second channel signal or both signals or a signal de-rived from the first channel signal or the second channel signal; a calculator for calculating a cross-correlation spectrum for a time block from the first channel signal in the time block and the second channel signal in the time block; a weighter for weighting a smoothed or non-smoothed cross-correlation spectrum to obtain a weighted cross correlation spectrum using a first weighting procedure or using a second weighting procedure depending on a signal characteristic estimated by the signal analyzer, wherein the first weighting procedure is different from the second weighting procedure, wherein the first weighting procedure has a weighting so that an amplitude is normalized and a phase is maintained, or wherein the second weighting procedure has a weighting factor derived from the smoothed or non-smoothed cross-correlation spectrum using a power operation having a power being lower than 1 and greater than 0 or a log function; and a processor for processing the weighted cross-correlation spectrum to obtain the inter-channel time difference.

According to another embodiment, a method of estimating an inter-channel time difference between a first channel signal and a second channel signal of a stereo signal or a multi-channel signal having more channel signals than the first channel signal and the second channel signal may have the steps of: estimating a signal characteristic of the first channel signal or the second channel signal or both signals or a signal derived from the first channel signal or the second channel signal; calculating a cross-correlation spectrum for a time block from the first channel signal in the time block and the second channel signal in the time block; weighting a smoothed or non-smoothed cross-correlation spectrum to obtain a weighted cross correlation spectrum using a first weighting procedure or using a second weighting procedure depending on a signal characteristic estimated, wherein the first weighting procedure is different from the second weighting procedure, wherein the first weighting procedure has a weighting so that an amplitude is normalized and a phase is maintained, or wherein the second weighting procedure has a weighting factor derived from the smoothed or non-smoothed cross-correlation spectrum using a power operation having a power being lower than 1 or greater than 0 or a log function; and processing the weighted cross-correlation spectrum to obtain the inter-channel time difference.

Another embodiment may have a non-transitory digital storage medium having stored thereon a computer program for performing a method of estimating an inter-channel time difference between a first channel signal and a second channel signal of a stereo signal or a multi-channel signal having more channel signals than the first channel signal and the second channel signal having the steps of: estimating a signal characteristic of the first channel signal or the second channel signal or both signals or a signal derived from the first channel signal or the second channel signal; calculating a cross-correlation spectrum for a time block from the first channel signal in the time block and the second channel signal in the time block; weighting a smoothed or non-smoothed cross-correlation spectrum to obtain a weighted cross correlation spectrum using a first weighting procedure or using a second weighting procedure depending on a signal characteristic estimated, wherein the first weighting procedure is different from the second weighting procedure, wherein the first weighting procedure has a weighting so that an amplitude is normalized and a phase is maintained, or wherein the second weighting procedure has a weighting factor derived from the smoothed or non-smoothed cross-correlation spectrum using a power operation having a power being lower than 1 or greater than 0 or a log function; and processing the weighted cross-correlation spectrum to obtain the inter-channel time difference, when said computer program is run by a computer.

The present invention is based on the finding that a weighting a smoothed or non-smoothed cross-correlation spectrum to obtain a weighted cross correlation spectrum is to be done using a first weighting procedure or using a second weighting procedure depending on a signal characteristic estimated by a signal analyzer, wherein the first weighting procedure is different from the second weighting procedures.

In a further embodiment, smoothing of the cross-correlation spectrum over time that is controlled by a spectral characteristic of the spectrum of the first channel signal or the second channel signal significantly improves the robustness and accuracy of the interchannel time difference determination.

In embodiments, a tonality/noisiness characteristic of the spectrum is determined, and in case of tone-like signal, a smoothing is stronger while, in case of a noisiness signal, a smoothing is made less strong.

Advantageously, a spectral flatness measure is used and, in case of tone-like signals, the spectral flatness measure will be low and the smoothing will become stronger, and in case of noise-like signals, the spectral flatness measure will be high such as about 1 or close to 1 and the smoothing will be weak.

Thus, in accordance with the present invention, an apparatus for estimating an interchannel time difference between a first channel signal and a second channel signal comprises a calculator for calculating a cross-correlation spectrum for a time block for the first channel signal in the time block and the second channel signal in the time block. The apparatus further comprises a spectral characteristic estimator for estimating a characteristic of a spectrum of the first channel signal and the second channel signal for the time block and, additionally, a smoothing filter for smoothing the cross-correlation spectrum over time using the spectral characteristic to obtain a smoothed cross-correlation spectrum. Then, the smoothed cross-correlation spectrum is further processed by a processor in order to obtain the inter-channel time difference parameter.

For embodiments related to the further processing of the smoothed cross-correlation spectrum, an adaptive thresholding operation is performed, in which the time-domain representation of the smoothed generalized cross-correlation spectrum is analyzed in order to determine a variable threshold, that depends on the time-domain representation and a peak of the time-domain representation is compared to the variable threshold, wherein an inter-channel time difference is determined as a time lag associated with a peak being in a predetermined relation to the threshold such as being greater than the threshold.

In one embodiment, the variable threshold is determined as a value being equal to an integer multiple of a value among the largest, for example ten percents of the values of the time domain representation or, alternatively, in a further embodiment for the variable determination, the variable threshold is calculated by a multiplication of the variable threshold and the value, where the value depends on a signal-to-noise ratio characteristic of the first and the second channel signals, where the value becomes higher for a higher signal-to-noise ratio and becomes lower for a lower signal-to-noise ratio.

As stated before, the inter-channel time difference calculation can be used in many different applications such as the storage or transmission of parametric data, a stereo/multi-channel processing/encoding, a time alignment of two channels, a time difference of arrival estimation for the determination of a speaker position in a room with two microphones and a known microphone setup, for the purpose of beamforming, spatial filtering, foreground/background decomposition or a location determination of a sound source, for example by acoustic triangulation based on time differences of two or three signals.

In the following, however, an implementation and usage of the inter-channel time difference calculation is described for the purpose of broadband time alignment of two stereo signals in a process of encoding a multi-channel signal having the at least two channels.

An apparatus for encoding a multi-channel signal having at least two channels comprises a parameter determiner to determine a broadband alignment parameter on the one hand and a plurality of narrowband alignment parameters on the other hand. These parameters are used by a signal aligner for aligning the at least two channels using these parameters to obtain aligned channels. Then, a signal processor calculates a mid-signal and a side signal using the aligned channels and the mid-signal and the side signal are subsequently encoded and forwarded into an encoded output signal that additionally has, as parametric side information, the broadband alignment parameter and the plurality of narrowband alignment parameters.

On the decoder-side, a signal decoder decodes the encoded mid-signal and the encoded side signal to obtain decoded mid and side signals. These signals are then processed by a signal processor for calculating a decoded first channel and a decoded second channel. These decoded channels are then de-aligned using the information on the broadband alignment parameter and the information on the plurality of narrowband parameters included in an encoded multi-channel signal to obtain the decoded multi-channel signal.

In a specific implementation, the broadband alignment parameter is an inter-channel time difference parameter and the plurality of narrowband alignment parameters are inter channel phase differences.

The present invention is based on the finding that specifically for speech signals where there is more than one speaker, but also for other audio signals where there are several audio sources, the different places of the audio sources that both map into two channels of the multi-channel signal can be accounted for using a broadband alignment parameter such as an inter-channel time difference parameter that is applied to the whole spectrum of either one or both channels. In addition to this broadband alignment parameter, it has been found that several narrowband alignment parameters that differ from subband to subband additionally result in a better alignment of the signal in both channels.

Thus, a broadband alignment corresponding to the same time delay in each subband together with a phase alignment corresponding to different phase rotations for different subbands results in an optimum alignment of both channels before these two channels are then converted into a mid/side representation which is then further encoded. Due to the fact that an optimum alignment has been obtained, the energy in the mid-signal is as high as possible on the one hand and the energy in the side signal is as small as possible on the other hand so that an optimum coding result with a lowest possible bitrate or a highest possible audio quality for a certain bitrate can be obtained.

Specifically for conversional speech material, it appears that there are typically speakers being active at two different places. Additionally, the situation is such that, normally, only one speaker is speaking from the first place and then the second speaker is speaking from the second place or location. The influence of the different locations on the two channels such as a first or left channel and a second or right channel is reflected by different time of arrivals and, therefore, a certain time delay between both channels due to the different locations, and this time delay is changing from time to time. Generally, this influence is reflected in the two channel signals as a broadband de-alignment that can be addressed by the broadband alignment parameter.

On the other hand, other effects, particularly coming from reverberation or further noise sources can be accounted for by individual phase alignment parameters for individual bands that are superposed on the broadband different arrival times or broadband de-alignment of both channels.

In view of that, the usage of both, a broadband alignment parameter and a plurality of narrowband alignment parameters on top of the broadband alignment parameter result in an optimum channel alignment on the encoder-side for obtaining a good and very compact mid/side representation while, on the other hand, a corresponding de-alignment subsequent to a decoding on the decoder side results in a good audio quality for a certain bitrate or in a small bitrate for a certain audio quality that may be used.

An advantage of the present invention is that it provides a new stereo coding scheme much more suitable for a conversion of stereo speech than the existing stereo coding schemes. In accordance with the invention, parametric stereo technologies and joint stereo coding technologies are combined particularly by exploiting the inter-channel time difference occurring in channels of a multi-channel signal specifically in the case of speech sources but also in the case of other audio sources.

Several embodiments provide useful advantages as discussed later on.

The new method is a hybrid approach mixing elements from a conventional M/S stereo and parametric stereo. In a conventional M/S, the channels are passively downmixed to generate a Mid and a Side signal. The process can be further extended by rotating the channel using a Karhunen-Loeve transform (KLT), also known as Principal Component Analysis (PCA) before summing and differentiating the channels. The Mid signal is coded in a primary code coding while the Side is conveyed to a secondary coder. Evolved M/S stereo can further use prediction of the Side signal by the Mid Channel coded in the present or the previous frame. The main goal of rotation and prediction is to maximize the energy of the Mid signal while minimizing the energy of the Side. M/S stereo is waveform preserving and is in this aspect very robust to any stereo scenarios, but can be very expensive in terms of bit consumption.

For highest efficiency at low bit-rates, parametric stereo computes and codes parameters, like Inter-channel Level differences (ILDs), Inter-channel Phase differences (IPDs), Inter-channel Time differences (ITDs) and Inter-channel Coherence (ICs). They compactly represent the stereo image and are cues of the auditory scene (source localization, panning, width of the stereo . . . ). The aim is then to parametrize the stereo scene and to code only a downmix signal which can be at the decoder and with the help of the transmitted stereo cues be once again spatialized.

Our approach mixed the two concepts. First, stereo cues ITD and IPD are computed and applied on the two channels. The goal is to represent the time difference in broadband and the phase in different frequency bands. The two channels are then aligned in time and phase and M/S coding is then performed. ITD and IPD were found to be useful for modeling stereo speech and are a good replacement of KLT based rotation in M/S. Unlike a pure parametric coding, the ambience is not more modeled by the ICs but directly by the Side signal which is coded and/or predicted. It was found that this approach is more robust especially when handling speech signals.

The computation and processing of ITDs is a crucial part of the invention. ITDs were already exploited in the conventional Binaural Cue Coding (BCC), but in a way that it was inefficient once ITDs change over time. For avoiding this shortcoming, specific windowing was designed for smoothing the transitions between two different ITDs and being able to seamlessly switch from one speaker to another positioned at different places.

Further embodiments are related to the procedure that, on the encoder-side, the parameter determination for determining the plurality of narrowband alignment parameters is performed using channels that have already been aligned with the earlier determined broadband alignment parameter.

Correspondingly, the narrowband de-alignment on the decoder-side is performed before the broadband de-alignment is performed using the typically single broadband alignment parameter.

In further embodiments, it is advantageous that, either on the encoder-side but even more importantly on the decoder-side, some kind of windowing and overlap-add operation or any kind of crossfading from one block to the next one is performed subsequent to all alignments and, specifically, subsequent to a time-alignment using the broadband alignment parameter. This avoids any audible artifacts such as clicks when the time or broadband alignment parameter changes from block to block.

In other embodiments, different spectral resolutions are applied. Particularly, the channel signals are subjected to a time-spectral conversion having a high frequency resolution such as a DFT spectrum while the parameters such as the narrowband alignment parameters are determined for parameter bands having a lower spectral resolution. Typically, a parameter band has more than one spectral line than the signal spectrum and typically has a set of spectral lines from the DFT spectrum. Furthermore, the parameter bands increase from low frequencies to high frequencies in order to account for psychoacoustic issues.

Further embodiments relate to an additional usage of a level parameter such as an inter-level difference or other procedures for processing the side signal such as stereo filling parameters, etc. The encoded side signal can represented by the actual side signal itself, or by a prediction residual signal being performed using the mid signal of the current frame or any other frame, or by a side signal or a side prediction residual signal in only a subset of bands and prediction parameters only for the remaining bands, or even by prediction parameters for all bands without any high frequency resolution side signal information. Hence, in the last alternative above, the encoded side signal is only represented by a prediction parameter for each parameter band or only a subset of parameter bands so that for the remaining parameter bands there does not exist any information on the original side signal.

Furthermore, it is advantageous to have the plurality of narrowband alignment parameters not for all parameter bands reflecting the whole bandwidth of the broadband signal but only for a set of lower bands such as the lower 50 percents of the parameter bands. On the other hand, stereo filling parameters are not used for the couple of lower bands, since, for these bands, the side signal itself or a prediction residual signal is transmitted in order to make sure that, at least for the lower bands, a waveform-correct representation is available. On the other hand, the side signal is not transmitted in a waveform-exact representation for the higher bands in order to further decrease the bitrate, but the side signal is typically represented by stereo filling parameters.

Furthermore, it is advantageous to perform the entire parameter analysis and alignment within one and the same frequency domain based on the same DFT spectrum. To this end, it is furthermore advantageous to use the generalized cross correlation with phase transform (GCC-PHAT) technology for the purpose of inter-channel time difference determination. In an embodiment of this procedure, a smoothing of a correlation spectrum based on an information on a spectral shape, the information advantageously being a spectral flatness measure is performed in such a way that a smoothing will be weak in the case of noise-like signals and a smoothing will become stronger in the case of tone-like signals.

Furthermore, it is advantageous to perform a special phase rotation, where the channel amplitudes are accounted for. Particularly, the phase rotation is distributed between the two channels for the purpose of alignment on the encoder-side and, of course, for the purpose of de-alignment on the decoder-side where a channel having a higher amplitude is considered as a leading channel and will be less affected by the phase rotation, i.e., will be less rotated than a channel with a lower amplitude.

Furthermore, the sum-difference calculation is performed using an energy scaling with a scaling factor that is derived from energies of both channels and is, additionally, bounded to a certain range in order to make sure that the mid/side calculation is not affecting the energy too much. On the other hand, however, it is to be noted that, for the purpose of the present invention, this kind of energy conservation is not as critical as in procedures of the known technology, since time and phase were aligned beforehand. Therefore, the energy fluctuations due to the calculation of a mid-signal and a side signal from left and right (on the encoder side) or due to the calculation of a left and a right signal from mid and side (on the decoder-side) are not as significant as in the known technology.

BRIEF DESCRIPTION OF THE DRAWINGS

Embodiments of the present invention will be detailed subsequently referring to the appended drawings, in which:

FIG. 3 is an illustration of different frequency resolutions and other frequency-related aspects for certain embodiments;

FIG. 10*b* illustrates a schematic representation of a signal further processing where the inter-channel time difference is applied;

DETAILED DESCRIPTION OF THE INVENTION

Figure 10A:
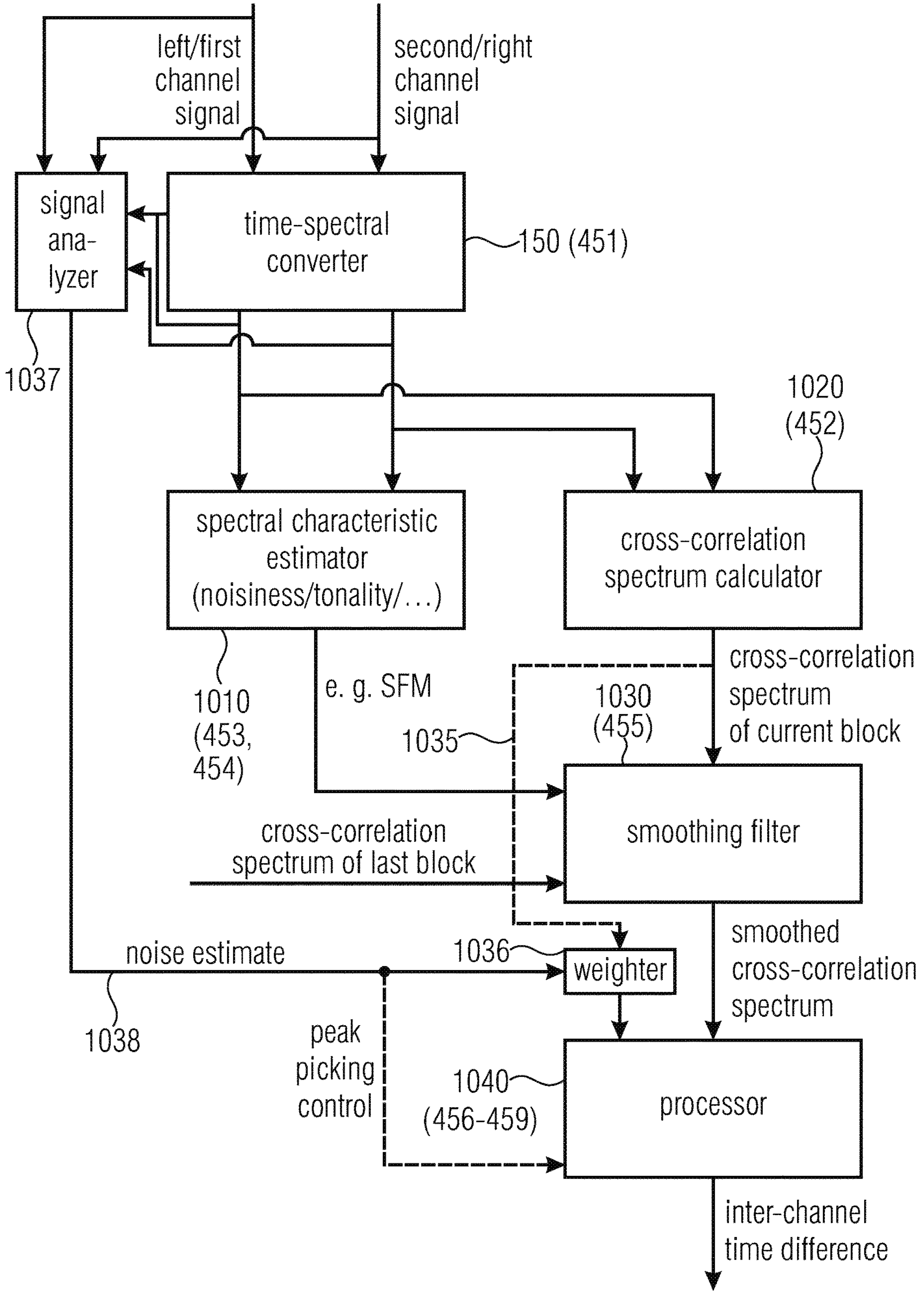
FIG. 10*a* illustrates an embodiment of an apparatus for estimating an inter-channel time difference.

FIG. 10*a* illustrates an embodiment of an apparatus for estimating an inter-channel time difference between a first channel signal such as a left channel and a second channel signal such as a right channel. These channels are input into a time-spectral converter 150 that is additionally illustrated, with respect to FIG. 4*e* as item 451.

Furthermore, the time-domain representations of the left and the right channel signals are input into a calculator 1020 for calculating a cross-correlation spectrum for a time block from the first channel signal in the time block and the second channel signal in the time block. Furthermore, the apparatus comprises a spectral characteristic estimator 1010 for estimating a characteristic of a spectrum of the first channel signal or the second channel signal for the time block. The apparatus further comprises a smoothing filter 1030 for smoothing the cross-correlation spectrum over time using the spectral characteristic to obtain a smoothed cross-correlation spectrum. The apparatus further comprises a processor 1040 for processing the smoothed correlation spectrum to obtain the inter-channel time difference.

Figure 10C:
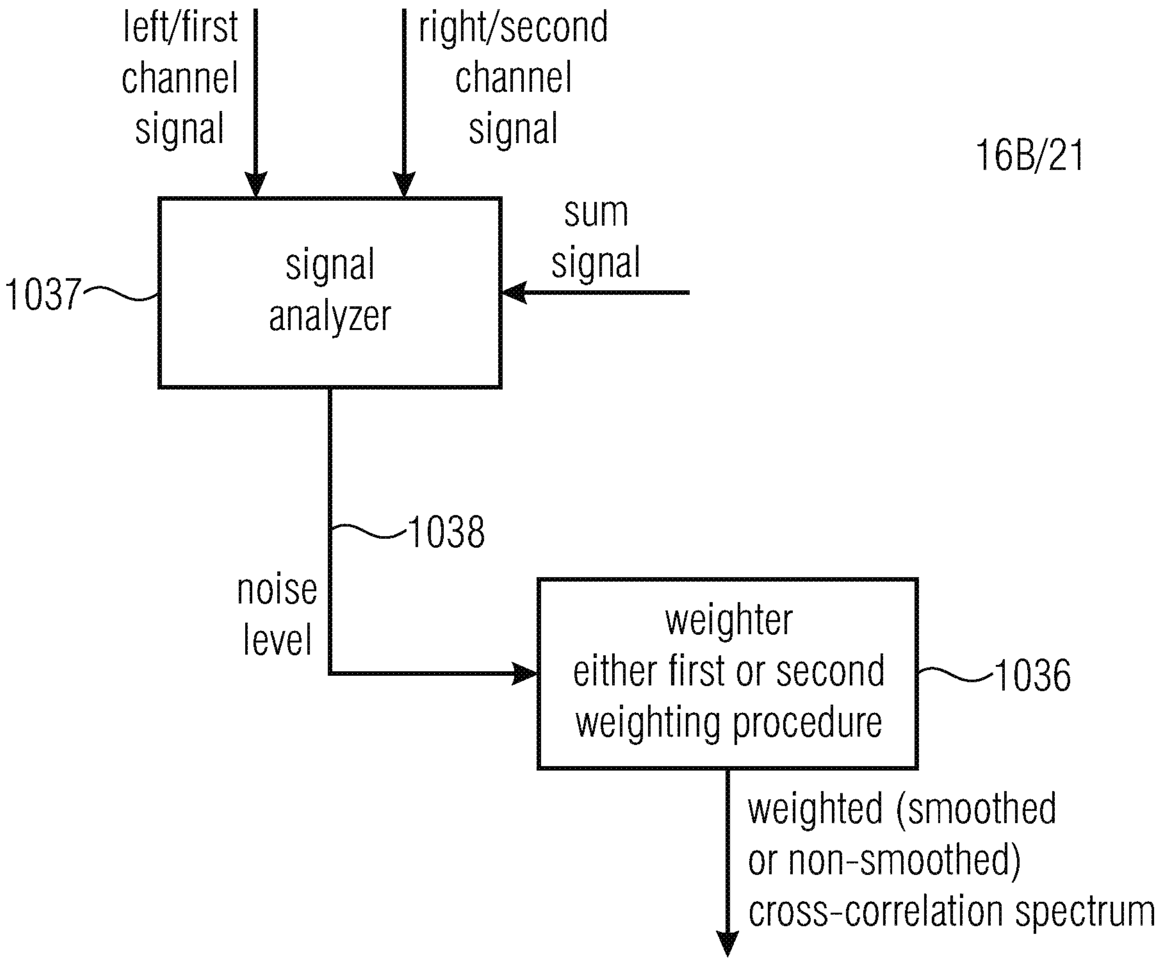
FIG. 10*c* illustrates a schematic representation of the signal analyzer implemented as a noise estimator in an embodiment and the weighter in accordance with embodiments of the invention.

Alternatively, in another embodiment, the element 1030 is not present, and, therefore, the element 1010 is not necessary as well, as indicated by the broken line 1035. The apparatus further comprises a signal analyzer 1037 calculating a signal characteristic estimate such as a noise estimate 1038. This estimate is forwarded to a weighter 1036 configured for performing different weighting operations depending on the signal characteristic estimate. The signal characteristic estimate is advantageously also used to control the processor 1040 for example when the processor 1040 performs the peak picking operation. FIG. 10*c* further illustrates the signal analyzer 1037 and the controllable weighter 1036.

Particularly, an apparatus in accordance with embodiments of the present invention is directed to the estimation of an inter-channel time difference between a first channel signal and a second channel signal. This device comprises the signal analyzer 1037 of FIG. 10*a*, a cross-correlation spectrum calculator 1020 of FIG. 10*a*, a weighter 1036 for weighting a smoothed or a non-smoothed cross-correlation spectrum of FIG. 10*a* and a subsequently connected processor 1040 for processing the weighted cross-correlation spectrum.

The elements time-spectrum converter 150, spectral characteristic estimator 1010, smoothing filter 1030 are not necessary for a basic implementation of the preset invention, but are advantageous for embodiments of the present invention. The signal analyzer 1037 is configured for estimating a signal characteristic such as a noise level 1038 of the first channel signal or the second channel signal or both signals or a signal derived from the first channel signal or the second channel signal. Thus, a signal characteristic or signal characteristic estimate such as a noise estimate to be used later on by the weighter 1036 and, advantageously, also used by the processor 1040 can be derived only from the left or first channel signal, only from the second or right channel signal, or can be derived from both signals. The derivation of the signal characteristic from both signals could, for example, be a derivation of an individual signal characteristic of the first channel signal, an additional individual signal characteristic from the second or right channel signal and, then, the final signal characteristic 1038 would be, for example, an average or a weighted average between both channels. Here, for example the weighting can be done in accordance with the amplitude so that different amplitudes in, for example, frames of the channels result in different influences of the corresponding individual noise estimate into the final noise level 1038. Furthermore, the signal derived from the first channel signal and the second channel signal could be, for example, a combination signal obtained by adding the left or first channel signal and the second or right channel signal together to obtain a combined signal and, then, the signal characteristic 1038 is calculated from the combined signal.

In an embodiment, the signal analyzer 1036 is implemented as a noise estimator or analyzer. However, other ways of signal analysis can be performed as well such as a tonality analysis, a voice activity detection, a transient analysis, a stereo analysis, a speech/music analysis, interfering-talker analysis, a background music analysis, a clean speech analysis or any other signal analysis in order to determine, whether a signal has a first characteristic or a second characteristic so that the matching weighting procedure is selected.

The combination can be a combination with equal weighting factors, i.e., a combination of the left channel without any weighting and the right channel without any weighting which would, correspond to weighting factors of 1.0 or, alternatively, different weighting factors can be applied. Furthermore, the signal derived from the first channel or the signal derived from the second channel can be obtained by performing a high-pass filtering or low-pass filtering or can be derived by performing a processing using an amplitude compression or an amplitude inverse compression function. An amplitude compression function would be a log function or a function with a power value being smaller than 1. An inverse compression function would be an exponential function or a power function with an exponent being greater than 1. Thus, depending on certain implementations, different processing operations can be applied to different left and right channel signals and both channels can be combined or not. In the embodiment, the left and the right channels are added together advantageously even without any specific weighting and the signal characteristic estimate is then calculated from the result of the combination calculation.

The calculator 1020 for calculating a cross-correlation spectrum for a time block from the first channel signal in the time block and the second channel signal in the time block can be implemented in several ways. One way is that a cross-correlation is calculated from the time domain signals in the time domain frames and the result is then converted from the time domain into the spectral domain. Another implementation is that, for example, by using a DFT or any other time-to-spectral conversion, subsequent frames of the first channel signal and subsequent frames of the second channel signal are converted into a spectral representation where the subsequent frames can be overlapping or non-overlapping. Thus, for each time block of the first channel signal, a spectral representation is obtained and, correspondingly, for each time block of the second channel signal, a spectral representation is obtained. The cross-correlation calculation is performed by multiplying a spectral value of a certain frequency bin k and a certain time block or time sample index s by the conjugate complex value of the spectral value with the same index k and the same index s from the spectral representation of the same time block of the second channel. Other cross-correlation calculation procedures different from the above described can be used as well in order to calculate the cross-correlation spectrum for a time block.

The weighter 1036 is configured for weighting the cross-correlation spectrum obtained by the calculator. In an implementation, the cross-correlation spectrum is a non-smoothed cross-correlation spectrum, but in other embodiments, the cross-correlation spectrum is smoothed where this smoothing is a smoothing with respect to time. Thus, for the purpose of calculating the smoothed cross-correlation spectrum, the cross-correlation spectrum of the last block can be used together with a (raw) cross-correlation spectrum of the current block and, depending on the implementation, a smoothing control information can be used as is, for example, provided by the spectral characteristic estimator 1010 of FIG. 10*a*. However, the smoothing can also be performed using a predetermined, i.e., constant or time-invariant smoothing setting. In accordance with embodiments of the invention, the weighted cross-correlation spectrum is calculated using a first weighting procedure 1036*a* or using a second weighted procedure 1036*b* which are, for example, illustrated in FIG. 10*d*. Particularly, the selection, whether the weighted cross-correlation spectrum is derived using the first or the second procedure is done depending on the signal characteristic estimated by the signal analyzer 1037. Thus, in accordance with the present invention, a weighting with a first weighting characteristic is used for a certain signal characteristic of the first channel or the second channel or the combined signal while a second weighting procedure is applied depending on another signal characteristic as determined by the signal analyzer 1037. The result of the weighter 1036 is a weighted and smoothed or non-smoothed cross-correlation spectrum that is then further processed by the processor 1040 to obtain the interchannel time difference between the first channel signal and the second channel signal.

Figure 10D:
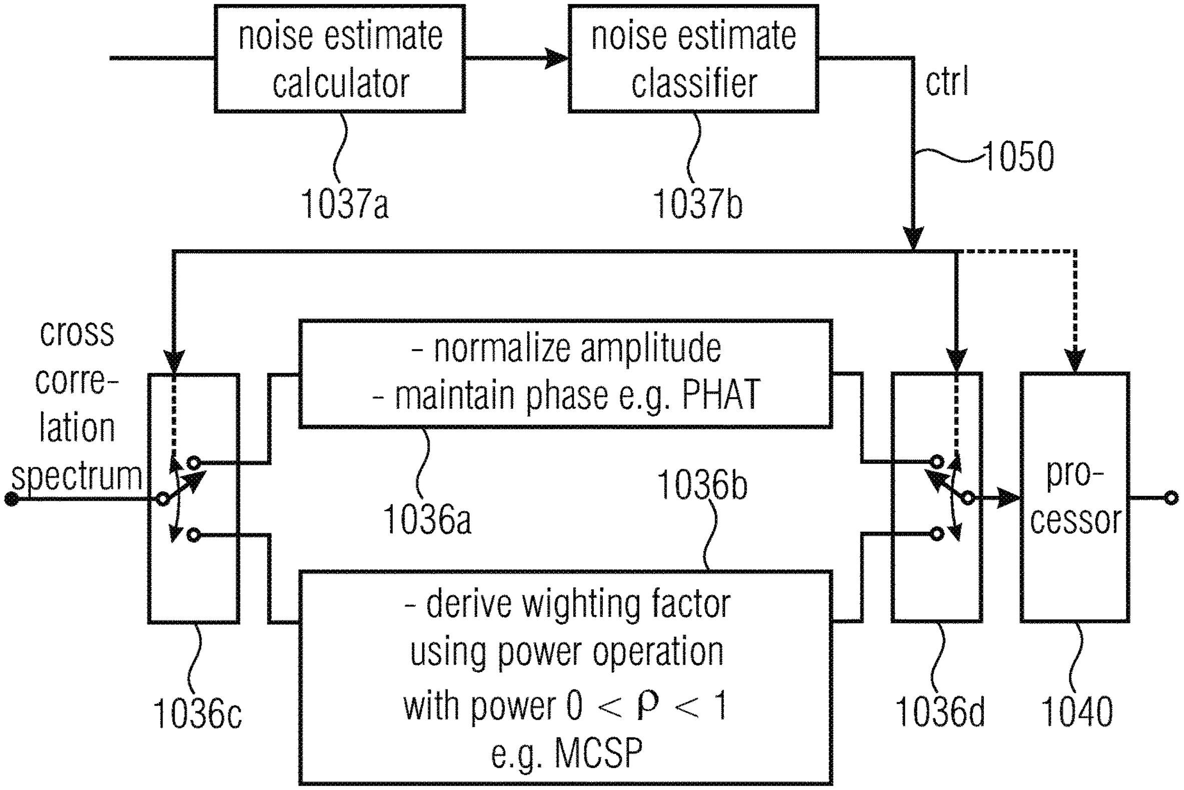
FIG. 10*d* illustrates a schematic representation of the weighter in accordance with embodiments of the invention.

FIG. 10*d* illustrates an implementation of the signal analyzer as a noise estimator and the weighter in connection with the processor 1040 in accordance with an embodiment of the invention. Particularly, the noise estimator 1037 comprises a noise estimate calculator 1037*a* and a noise estimate classifier 1037*b*. The noise estimate classifier 1037*b* outputs a control signal 1050 corresponding to the noise estimate output 1038 generated by block 1037 in FIG. 10*a*. This control signal can be applied to a first switch 1036*c* or a second switch 1036*d*. In this implementation, processing kernels 1036*a* implementing the first weighting procedure and another calculating kernel for implementing the second weighting procedure 1036*b* is provided. Depending on the implementation, only switch 1036*c* is provided and, depending on the control signal 1050, only the weighting procedure as determined by the switch 1036*c* is selected, i.e., the cross-correlation spectrum as determined by the calculator 1020 is input into the switch 1036*c* and depending on the switch setting, forwarding to either the kernel 1036*a* or the kernel 1036*b*. In another implementation, switch 1036*c* is not there by the cross-correlation spectrum as determined by block 1020 is fed into both processing kernels 1036*a* and 1036*b* and, depending on the control of the output switch 1036*d*, either the output of block 1036*a* or the output of block 1036*b* is selected and forwarded to the processor 1040. Thus, depending on the implementation, only a single weighted cross-correlation spectrum is calculated where the selection of which one is calculated is done by the control signal 1050 and the input switch. Alternatively, both weighted cross-correlation spectra are calculated and only the cross-correlation spectrum that is selected by the output switch 1036*d* is forwarded to the processor 1040. Furthermore, only a single processing kernel can be there without any input/output switches and depending on the control signal, the correct weighting procedure is set for the corresponding time block. Thus, for each time block, a noise estimate or control signal 1050 can be calculated and, for each time block, the weighting can be switched from one weighting procedure to the other weighting procedure. In this context, it is to be noted that there can also be implemented three or more different weighting procedures depending on three or more different noise estimates as the case may be. Thus, the present invention not only incurs the selection between two different weighting procedures, but also includes the selection between three or more weighting procedures depending on a control signal derived from the noise characteristic of the first and the second channel signals.

In an implementation, the first weighting procedure comprises a weighting so that an amplitude is normalized and a phase is maintained and the second weighting procedure comprises a weighting factor derived from the smoothed or the non-smoothed cross-correlation spectrum using a power operation having a power being lower than 1 or greater than 0. Preferably, the power is between 0.79 and 0.82. Furthermore, the first weighting procedure can be most identical to the second weighting procedure except that the second weighting procedure uses a power between 0 and 1, i.e., a power being greater than 0 and smaller than 1, while the first weighting procedure does not apply any power or, stated in other words, applies a power of 1. Thus, the normalization performed by the second weighting procedure is compressed, i.e., that normalization factor applied by the first weighing procedure has some value and the normalization factor applied via the second weighting procedure to the same spectral cross-correlation value has a smaller magnitude. This applies for higher spectral values of the cross-correlation spectrum. However, for small values of the cross-correlation spectrum, the normalization value for the second weighting procedure is greater than the normalization value for the first weighting procedure with respect to the same spectral value of the cross-correlation spectrum. This is due to the fact that a power operation with a pow-er lower than 1 such as a square root operation having a power of ½ increases small values but lowers high values. Thus, additional weighting factor calculations for the second weighting procedure can also comprise any compression function such as a log function. In an embodiment, the first weighting procedure operates based on the weighting applied for the phase transform (PHAT), and the second weighting procedure operates based on the calculations applied for modified cross-power spectrum phase procedure (MCSP).

Furthermore, the second weighting procedure is advantageously implemented to comprise a normalization so that an output range of the second normalization procedure is in a range, in which an output range of the first normalization procedure is positioned, or so that the output range of the second normalization procedure is the same as an output range of the first normalization procedure. This can, for example, be implemented by calculating the absolute values of all spectral values of the MCSP-weighted cross-correlation spectrum, by adding together all magnitudes of one spectral representation corresponding to one time block and by then dividing the result by the number of spectral values in a time block.

Generally, the processor 1040 of FIG. 10*a* is configured to perform some processing steps with respect to the weighted cross-correlation spectrum where, particularly, a certain peak picking operation is performed in order to finally obtain the inter-channel time difference. Advantageously, this peak picking operation takes place in the time domain, i.e., the weighted and smoothed or non-smoothed cross-correlation spectrum is converted from the spectral representation in a time domain representation and, then, this time domain representation is analyzed and, particularly, a peak or several peaks are picked based on a threshold. Depending on the setting of the noise estimate, either a first peak picking operation or a second peak picking operation is performed, where, advantageously, both peak picking operations are different from each other with respect to the threshold used by the peak picking operation.

Figure 10E:
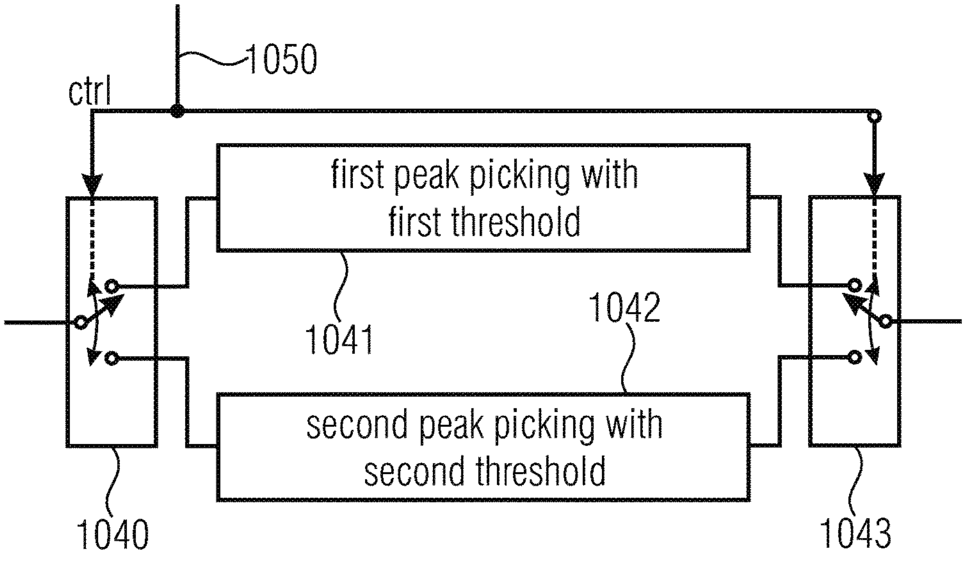
FIG. 10*e* illustrates a schematic representation of the processor in accordance with embodiments of the invention.

FIG. 10*e* illustrates a situation being similar, with respect to input switch 1040 and output switch 1043, to the procedure in FIG. 10*d*. In an implementation illustrated in FIG. 10*e*, both peak picking operations can be applied and the result of the "correct" peak picking operation can be selected by the output switch 1043. Alternatively, the input switch is there and depending on the control signal 1050, only the correct peak picking procedure is selected, i.e., either 1041 or 1042. Thus, in an implementation, there will not be both switches, but in an implementation there will be either the input switch 1040 or the output switch 1043 in analogy of what has been derived before with respect to FIG. 10*d*. In an additional implementation, there only exists a single processing kernel applying the peak picking operation with a variable threshold and the control signal 1050 is used in order to set the correct threshold within the single processing kernel. In an embodiment, the threshold setting is performed in such a way that the second threshold is higher than the first threshold, where the second threshold, therefore, is used when the second weighting procedure in block 1036*b* has been applied, and where the first threshold is used, when the first weighting procedure in block 1036*a* has been applied. Thus, when a high level of background noise is detected, then the second weighting procedure with a power between 0 and 1 or a log operation, i.e., a compression procedure is applied and, then, the threshold for the peak picking should be lower compared to a peak picking threshold to be used when a low level of background noise is detected, i.e., when the first weighting procedure is applied that performs a normalization with a normalization factor that does not rely on a compression function such as a log function or a power function with a power smaller than 1.

Figure 10F:
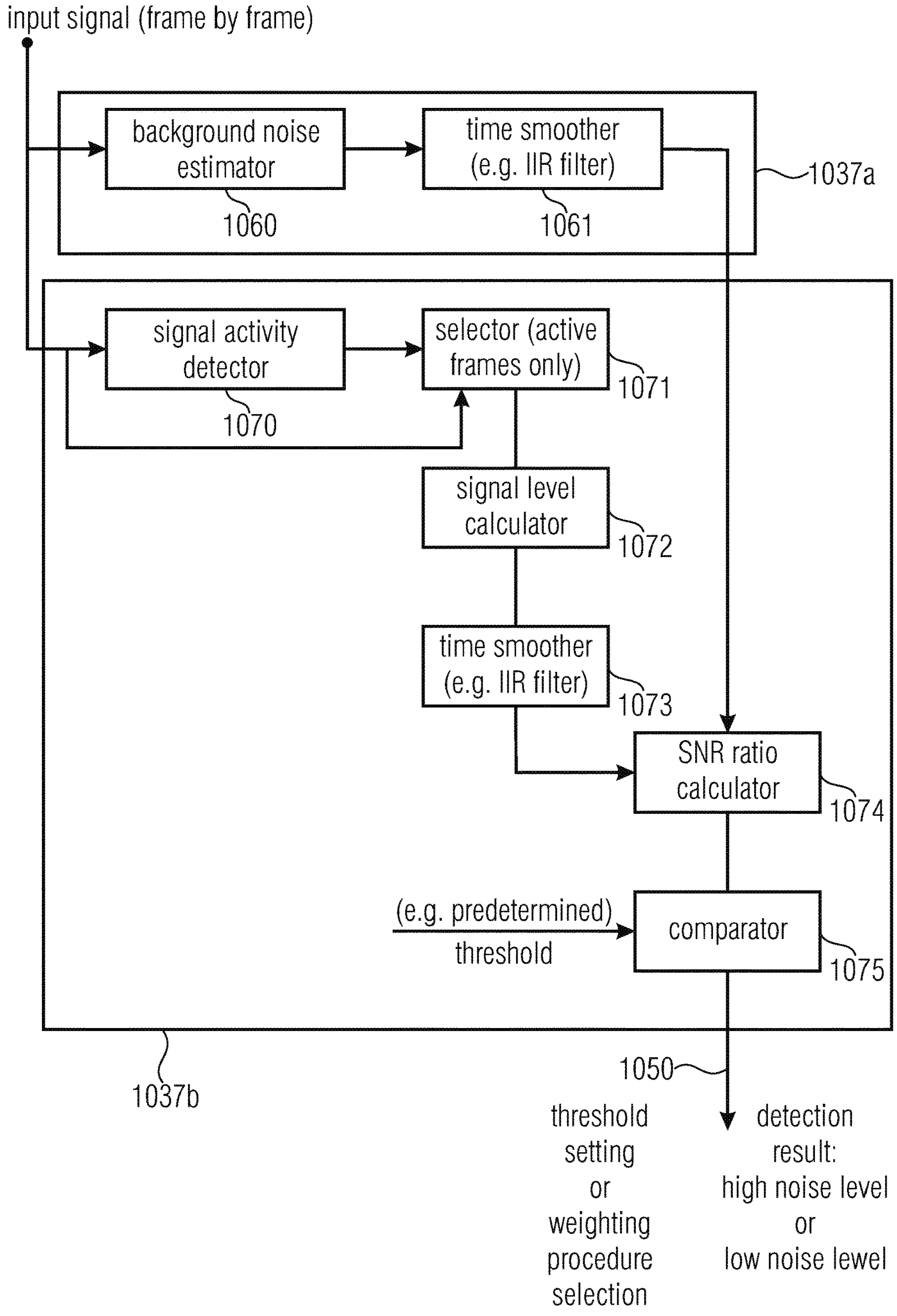
FIG. 10*f* illustrates a schematic representation of the noise estimator in accordance with embodiments of the invention.

Subsequently, an implementation of the signal analyzer as the noise estimator 1037 is illustrated in FIG. 10*f*. Basically, the noise estimator 1037 consists of a noise estimate calculator 1037*a* and a noise estimate classifier 1037*b* as illustrated in FIG. 10*d* and also indicated in FIG. 10*f*. The noise estimate calculator 1037*a* comprises a background noise estimator 1060 and the subsequently connected (time) smoother 1061 which can, for example, be implemented as an IIR filter.

The input into the noise estimate calculator 1037*a* or, particularly, the background noise estimator 1060 is a frame of the left or first channel signal, a frame of the second or right channel signal or a signal derived from such channel signal or a combined signal obtained by adding, for example, a time domain representation of the first channel signal and a time domain representation of the second channel signal in the same time block.

With respect to the noise estimate classifier 1037*b*, the input signal is delivered to a signal activity detector 1070 controlling a selector 1071. Based on the result of the signal activity detector 1070, the selector 1071 selects the active frames only. Furthermore, a signal level calculator 1072 is connected subsequent to the selector 1071. The calculated signal level is then forwarded to a (time) smoother 1073 which is, for example, implemented as an IIR filter. Then, in blocks 1074, a signal-to-noise ratio calculation takes place and the result is compared, within a comparator 1075 to an advantageously predetermined threshold which is, for example, between 45 dB and 25 dB and advantageously is even in a range between 30 and 40 dB and more advantageously, is at 35 dB.

The output of the comparator 1075 is the detection result indicating either a high noise level or a low noise level or indicating that a threshold setting in a certain way is to be performed by a single weighting procedure processor or, when there are two weighing procedure processors as illustrated in FIG. 10*d*, then the decision result from the comparator 1075, i.e., signal 1050 controls either the input switch 1036*c* or the output switch 1036*d* in order to forward the correctly weighted cross-correlation spectrum to the processor 1040.

The detection result 1050 is advantageously calculated for each time block or frame. Thus, when, for example, for a certain frame, the signal activity detector 1070 indicates that this is a non-active frame, then neither a signal level calculation nor a time smoothing is performed for this frame, since the selector 1071 only selects an active frame. Thus, for an inactive frame an SNR ratio calculation is not performed in an embodiment and, therefore, in this embodiment, for this inactive frame, a detection result is not provided at all. Thus, in an implementation, the same weighting procedure as has been determined before with respect to the last active frame is used or, alternatively, for an inactive frame, either the first weighting procedure or the second weighting procedure or even a third weighting procedure is applied as fallback solution. Alternatively, the SNR ratio calculator 1074 can be implemented to use, for an inactive frame, the time-smoothed signal level of the last or most recently occurring active frame. Thus, detection result can either be obtained even for inactive frames or, for inactive frames, a certain (fallback) weighting procedure is used or, for inactive frames, the same weighting procedure as has been determined for the last active frame preceding the inactive frame is continued to be used as the case may be.

In a previous patent application [1], an Inter-channel Time Difference (ITD) estimator was introduced. This estimator is based on the Generalized Cross-Correlation with PHAse Transform (GCC-PHAT), a technique widely used in the TDOA literature (initial paper is [2], another good reference is [3]). The time difference between the two channels is found by peak-picking the output of the GCC. Better robustness can be obtained either by using a large analysis window length or by smoothing the cross-correlation spectrum over time. The main contribution of [1] was to make this smoothing adaptive with a smoothing factor dependent on a spectral flatness measure.

The steps of the ITD estimator of [1] can be described as follows:

1. Discrete Fourier Transform: the signal of the left channel $x_L(n)$ and the signal of the right channel $x_R(n)$ are framed, windowed and transformed to the frequency-domain using a DFT $$X_L(k,s)=\sum_{n=0}^{N_{DFT}-1} x_L(n+sN)w(n)e^{-i2\pi\frac{kn}{N_{DFT}}}\ X_R(k,s)=\sum_{n=0}^{N_{DFT}-1} x_R(n+sN)w(n)e^{-i2\pi\frac{kn}{N_{DFT}}}$$

$$X_L(k,s)=\sum_{n=0}^{N_{DFT}-1} x_L(n+sN)w(n)e^{-i2\pi\frac{kn}{N_{DFT}}}\ X_R(k,s)=\sum_{n=0}^{N_{DFT}-1} x_R(n+sN)w(n)e^{-i2\pi\frac{kn}{N_{DFT}}}$$

with n is the time sample index, s is the frame index, k is the frequency index, N is the frame length, $N_{DFT}$ is the DFT length and w(n) is the analysis window.

2. Cross-correlation spectrum: the correlation between the two channels is computed in the frequency domain $$C(k,s)=X_L(k,s)X_R^*(k,s)$$

3. Smoothing: the cross-correlation spectrum is smoothed over time with a smoothing factor depending on a spectral flatness measure. Stronger smoothing is used when the spectral flatness is low in order to make the ITD estimator more robust on stationary tonal signals. Weaker smoothing is used when the spectral flatness is high in order to make the ITD estimator adapt faster on transient signals i.e. when the signal is quickly changing. The smoothing is performed using $$\tilde{C}(k,s)=(1-sfm(s))\tilde{C}(k,s-1)+sfm(s)C(k,s)$$

with $$sfm(s)=\max(sfm\_chan(X_L),\ sfm\_chan(X_R))\text{ and}$$

$$sfm(s)=\max(sfm\_chan(X_L),\ sfm\_chan(X_R))$$

$$sfm\_chan(X)=\frac{\prod_{k=0}^{N_{sfm}-1} X(k,s)^{\frac{1}{N_{sfm}}}}{\sum_{k=0}^{N_{sfm}-1}\frac{X(k,s)}{N_{sfm}}}$$

$$sfm\_chan(X)=\frac{\prod_{k=0}^{N_{sfm}-1} X(k,s)^{\frac{1}{N_{sfm}}}}{\sum_{k=0}^{N_{sfm}-1}\frac{X(k,s)}{N_{sfm}}}$$

4. Weighting: the smoothed cross-correlation spectrum is weighted by the inverse of its magnitude. This weighting normalizes the amplitude and keeps only the phase, this is why it is called the Phase Transform (PHAT).

$$\tilde{C}_{PHAT}(k,s)=\frac{\tilde{C}(k,s)}{|\tilde{C}(k,s)|}$$

5. Inverse Transform: the final GCC is obtained by transforming the cross-correlation spectrum $\tilde{C}_{PHAT}(k,s)$ back to the time-domain $$GCC(n)=\frac{1}{N_{DFT}}\sum_{k=0}^{N_{DFT}-1}\tilde{C}_{PHAT}(k,s)e^{i2\pi\frac{kn}{N_{DFT}}}$$

6. Peak-picking: the simplest approach is to search for the global maximum of the absolute value of the GCC found in Step 5. If this maximum has a value above some threshold, an ITD is estimated as the lag n corresponding to this maximum. More advanced approaches use additionally hysteresis- and/or hang-over-based mechanisms to obtain a smoother ITD estimation over time.

The GGC-PHAT performs very well in low noise, reverberative environments (see for example [3]). However, when the level of the background noise is high or at presence of other signal components (such as music, transients, complex stereo scenes, frames classified as inactive, interfering talkers), the GCC-PHAT performance drops significantly. The GCC output is then noisy and does not contain one single strong peak. Consequently, a peak-picking often fails to find the correct ITD. This is because the Phase Transform treats all frequencies equally, regardless of the signal-to-noise ratio. The GCC is then polluted by the phase of the bins whose signal-to-noise ratio is low. To avoid this problem, many other GCC weightings were proposed in the literature. One of them was found to be very effective on our problematic test signals. It was first proposed in [4] and was called at that time "modified cross-power spectrum phase" (MCSP). Its good performance in high noise environments was later confirmed in several other papers (see e.g. [5]). The weighting (Step 4. of known technology) is modified as follows:

$$\tilde{C}_{MCSP}(k,s)=\frac{\tilde{C}(k,s)}{|\tilde{C}(k,s)|^{\rho}}=\tilde{C}_{PHAT}(k,s)|\tilde{C}(k,s)|^{1-\rho}$$

with ρ a parameter between 0 and 1. ρ=0 corresponds to the case of the normal cross-correlation and ρ=1 corresponds to the case of the GCC-PHAT. A value below but close to 1 is usually used, which allows to modify the GCC-PHAT by putting more emphasis to the bins with high correlation, those usually corresponding to the signal while the bins with low correlation corresponding to the noise. More precisely, we have found that a value ρ=0.8 gave the best performance (it was 0.75 in [4] and 0.78 in [5]).

Unfortunately, this new weighting performs better than GCC-PHAT only when a high-level of background noise is present. Alternative scenarios where the new weighting possibly performs better than GCC-PHAT are inactive frames (i.e. voice activity detection detects inactive, which could indicate a low speech level), presence of transients, complex stereo scenarios, music, interfering talkers, presence of background music, speech which is not clean, In clean environments, like speech with no or only a low-level of background noise or music or other signal components which deviate from clean speech, GCC-PHAT still performs better. In order to achieve the best results, it may be useful to switch between the two approaches depending on the signal content.

To detect the presence of high level of background noise in the signal, a noise estimator together with a signal activity detector (SAD) are used. The level of the signal is can be estimated on the frames where the SAD detects a signal, while the level of the noise $l_N$ is estimated by the noise estimator. The presence of high level of background noise is then simply detected by comparing the signal-to-noise-ratio snr=$l_S$–$l_N$ (in dB) to a threshold, e.g. if snr<35 then high noise level is detected.

Once it is known whether the signal contains a high level of background noise or not, a decision is made to select either the PHAT weighting or the MCSP weighting for computing the GCC (Step 4. in the known technology). The peak-picking (Step 6. in the known technology) can also be modified depending on whether there is high background noise level detected, for exampling by lowering the threshold.

Subsequently, an embodiment is described in a step by step manner.

0. High background noise level detection:
   a. a noise estimator (for example from [6]) is used to estimate the level of background noise $l_N$. An IIR smoothing filter is used to smooth the noise level over time.
   b. a signal activity detector (for example from [6]) is used to classify a frame as active or inactive. The active frames are then used to compute the signal level $l_S$, simply by computing the signal energy and smoothing it over time using a IIR smoothing filter.
   c. If the signal-to-noise-ratio snr=$l_S$–$l_N$ (in dB) is below a threshold (e.g. dB), then high background noise level is detected.
1. Discrete Fourier Transform: same as in any known technology
2. Cross-correlation spectrum: same as in any known technology
3. Smoothing: same as in any known technology or as described herein based on the spectral characteristic
4. Weighting:
   If low level of background noise is detected, then the same weighting as in the known technology is used (GCC-PHAT).
   If high level of background noise is detected, then the MCSP weighting is used $$\tilde{C}_{MCSP}(k,s)=\frac{\tilde{C}(k,s)}{|\tilde{C}(k,s)|^{\rho}}$$

with 0<ρ<1 (e.g. ρ=0.8). In order to keep the GCC-MCSP output in the same range as the GCC-PHAT output, an additional normalization step is performed $$\tilde{C}_{MCSP}(k,s)=\frac{\tilde{C}_{MCSP}(k,s)}{\frac{1}{N_{DFT}}\sum_{k=0}^{N_{DFT}-1}|\tilde{C}_{MCSP}(k,s)|}$$

5. Inverse Transform: same as in any known technology
6. Peak-picking: the peak-picking can be adapted in case high level of background noise is detected and the MCSP weighting is used. Particularly, it has been found that a lower threshold is beneficial.

Furthermore, FIG. 10*a* illustrates an implementation that is different from the implementation of FIG. 10*c*. In the weighter 1036 of FIG. 10*c*, the weighter performs either the first or the second weighting procedure. However, in the weighter 1036 as illustrated in FIG. 10*a*, the weighter only performs the second weighting procedure with respect to the notation in FIG. 10*d* or 10*c*. This implementation is useful, when a smoothing filter as illustrated in block 1030 is used that already performs the first weighing procedure subsequent to the smoothing or together with the smoothing in e.g. a single mathematical or hardware operation. Thus, in case of performing the first weighting procedure which is the normalization operation without any compression in the smoothing filter, then both, the smoothing filter 1030 on the one hand and the actual weighter 1036 on the hand correspond to the actual weighter for weighting the smoothed or non-smoothed or non-smoothed cross-correlation spectrum. Thus, in the implementation of FIG. 10*a*, the noise estimate 1038 is only provided to a separate weighter 1036 and the selection between either the output of the smoothing filter 1030 which is already weighted in accordance with the weighting procedure and the selection between the output of the actual weighter 136 in FIG. 10*a* is done by a certain processor setting 1040 that automatically uses the output from the smoothing filter 1030, when the weighter 1036 does not provide any output signal but automatically prioritizes the output of the weighter 1036 over the output of the smoothing filter 1030, when the weighter 1036 provides and output. Then, the noise estimate 1038 or, as discussed in other figures, the control signal 1050 is then used for either activating or deactivating the weighter 1036. Thus, the actual weighter for weighting the smoothed or non-smoothed cross-correlation spectrum using a first order weighting procedure can be implemented in many different ways such as in the specific activation/deactivation mode in FIG. 10*a* or the two-kernel mode in FIG. 10*d* with an input or an output switch or in accordance with a single weighting procedure kernel that, depending on the control signal selects one or the other weighing procedure or adapts a general weighting processor to perform the first or the second weighting procedure.

Subsequently, an embodiment, where a smoothing is performed before weighting is described. In this context, the functionalities of the spectral characteristic estimator are also reflected by FIG. 4*e*, items 453, 454 in an embodiment.

Furthermore, the functionalities of the cross-correlation spectrum calculator 1020 are also reflected by item 452 in FIG. 4*e* described later on in an embodiment.

Correspondingly, the functionalities of the smoothing filter 1030 are also reflected by item 453 in the context of FIG. 4*e* to be described later on. Additionally, the functionalities of the processor 1040 are also described in the context of FIG. 4*e* in an embodiment as items 456 to 459.

Embodiments of the processor 1040 are also described in FIG. 10*c*

Advantageously, the spectral characteristic estimation calculates a noisiness or a tonality of the spectrum where an implementation is the calculation of a spectral flatness measure being close to 0 in the case of tonal or non-noisy signals and being close to 1 in the case of noisy or noise-like signals.

Particularly, the smoothing filter is then configured to apply a stronger smoothing with a first smoothing degree over time in case of a first less noisy characteristic or a first more tonal characteristic, or to apply a weaker smoothing with a second smoothing degree over time in case of a second more noisy or second less tonal characteristic.

Particularly, the first smoothing is greater than the second smoothing degree, where the first noisy characteristic is less noisy than the second noisy characteristic or the first tonal characteristic is more tonal than the second tonal characteristic. The implementation is the spectral flatness measure.

Figure 4A:
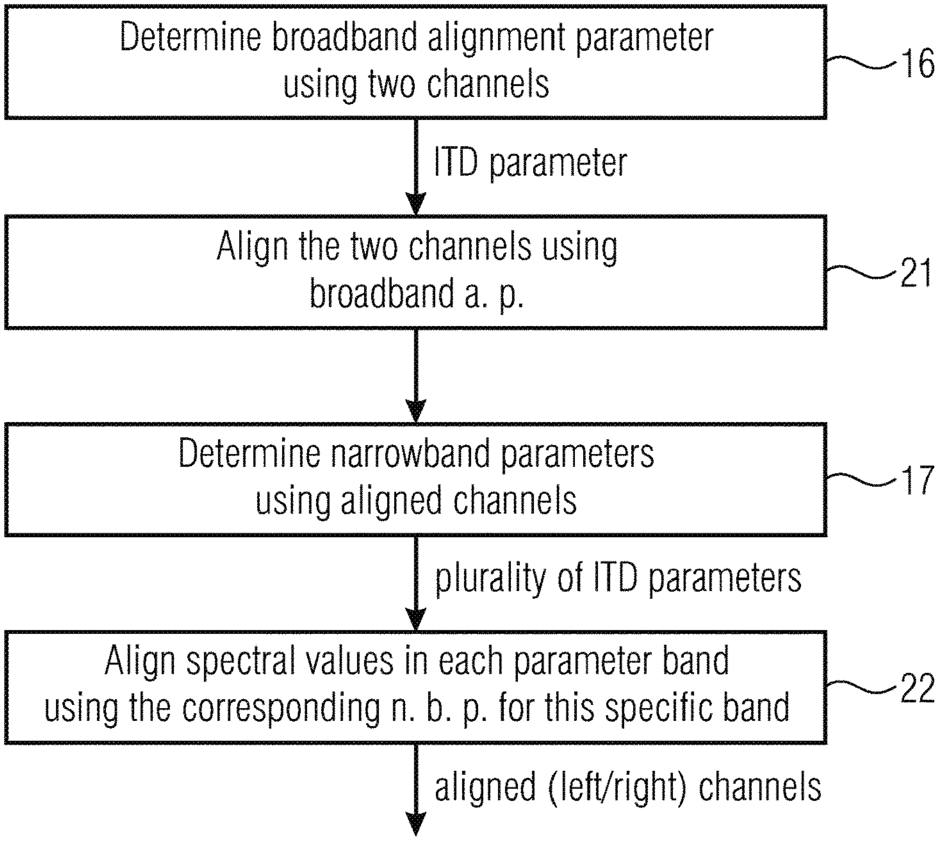
FIG. 4*a* illustrates a flowchart of procedures performed in the apparatus for encoding for the purpose of aligning the channels.
Figure 4B:
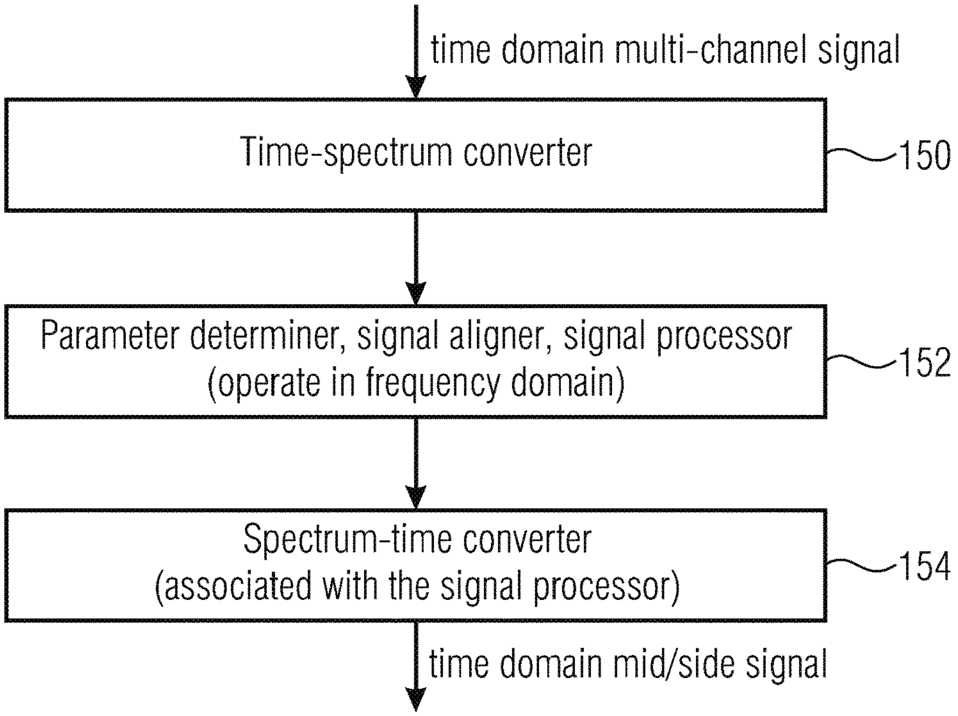
FIG. 4*b* illustrates an embodiment of procedures performed in the frequency domain.
Figure 4C:
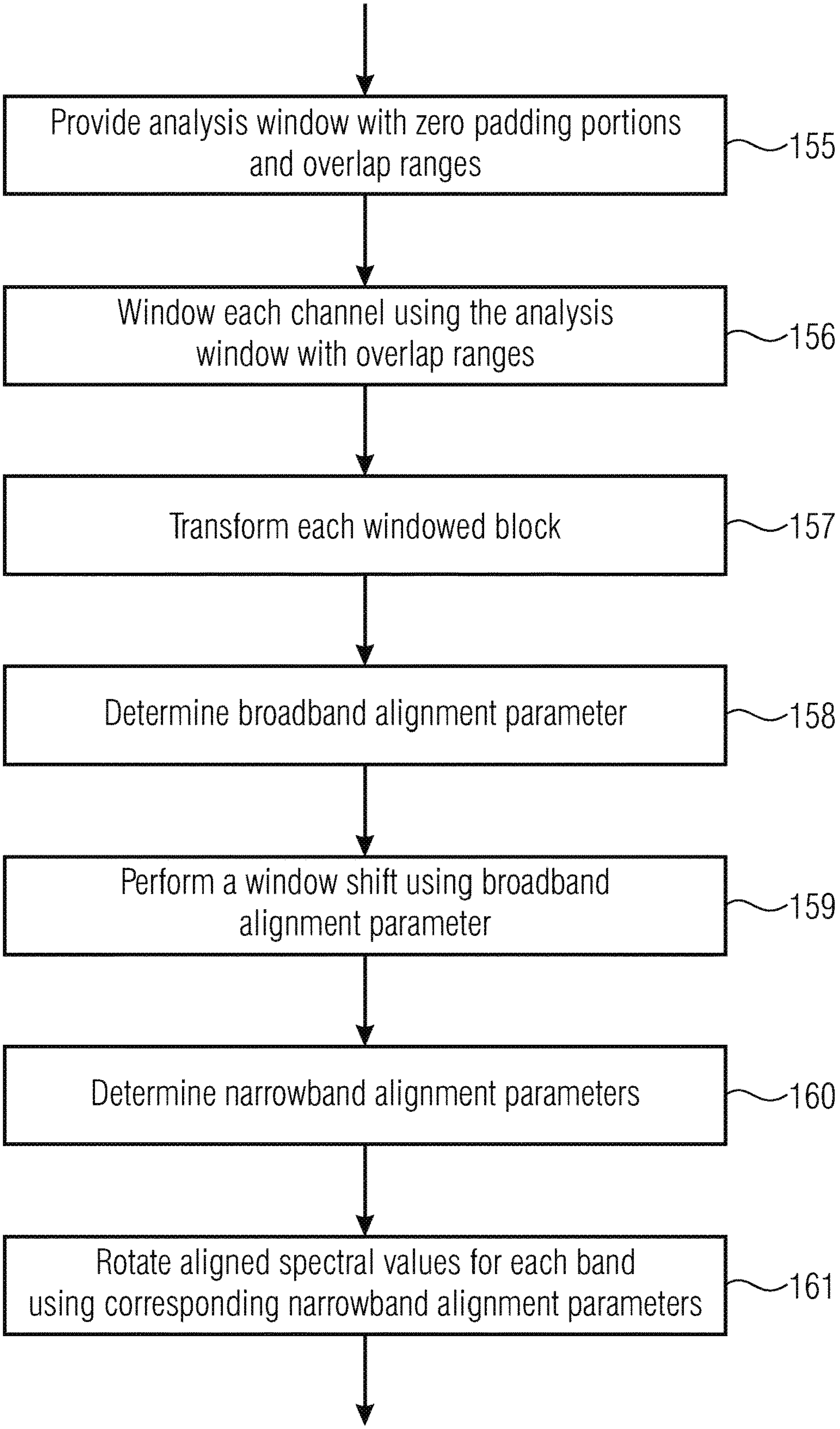
FIG. 4*c* illustrates an embodiment of procedures performed in the apparatus for encoding using an analysis window with zero padding portions and overlap ranges.
Figure 4D:
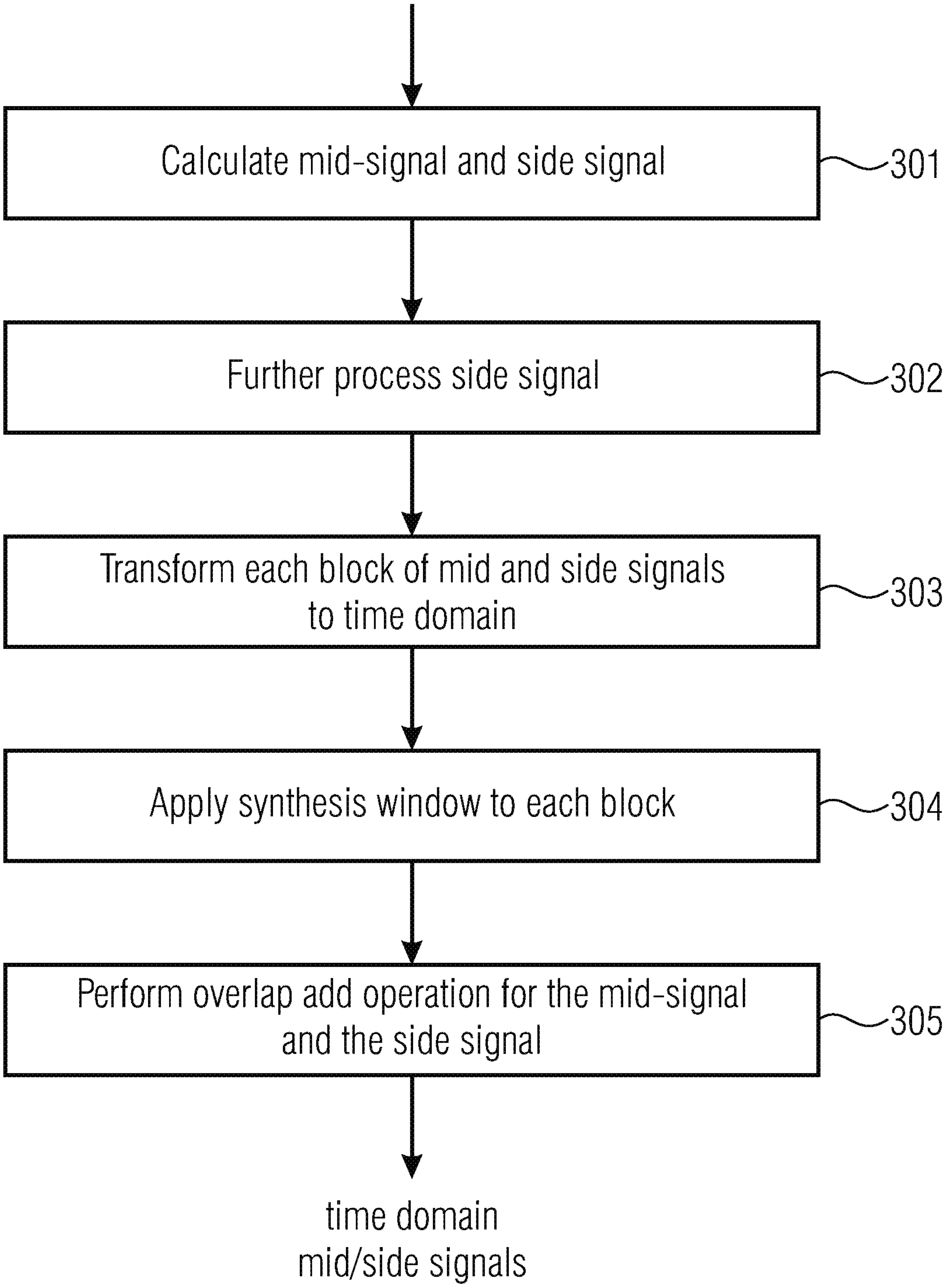
FIG. 4*d* illustrates a flowchart for further procedures performed within the apparatus for encoding.
Figure 4E:
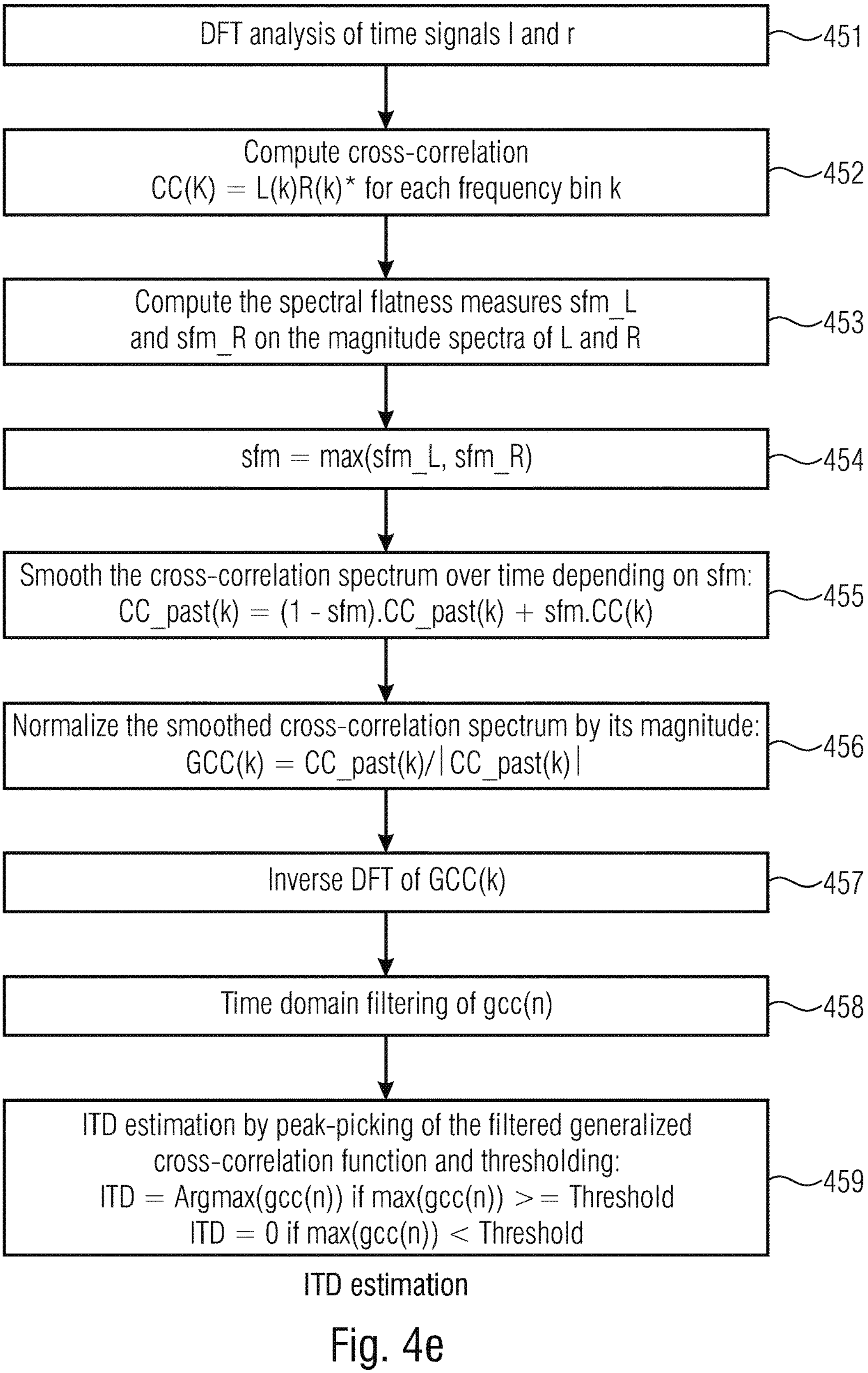
FIG. 4*e* illustrates a flowchart for showing an implementation of an inter-channel time difference estimation.
Figure 11A:
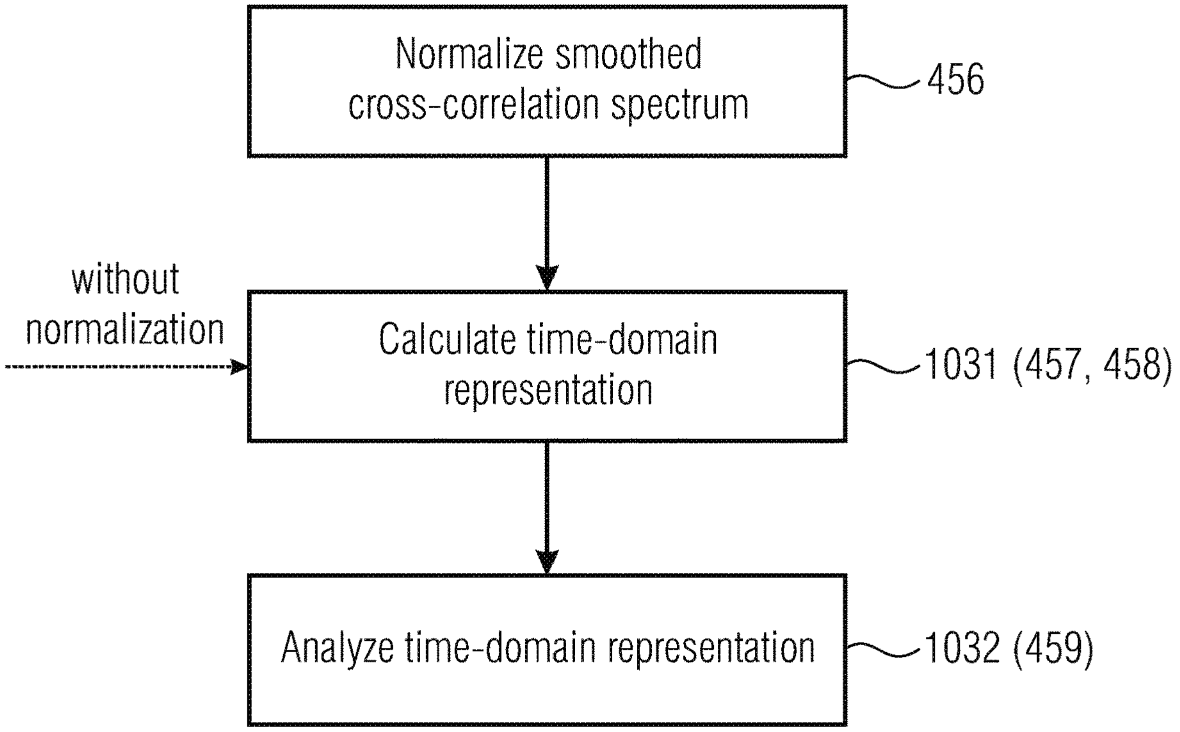
FIG. 11*a* illustrates procedures performed by the processor of FIG. 10*a;*

Furthermore, as illustrated in FIG. 11*a*, the processor is advantageously implemented to normalize the smoothed cross-correlation spectrum as illustrated at 456 in FIGS. 4*e* and 11*a* before performing the calculation of the time-domain representation in step 1031 corresponding to steps 457 and 458 in the embodiment of FIG. 4*e*. However, as also outlined in FIG. 11*a*, the processor can also operate without the normalization in step 456 in FIG. 4*e*. Then, the processor is configured to analyze the time-domain representation as illustrated in block 1032 of FIG. 11*a* in order to find the inter-channel time difference. This analysis can be performed in any known way and will already result in an improved robustness, since the analysis is performed based on the cross-correlation spectrum being smoothed in accordance with the spectral characteristic.

Figure 11B:
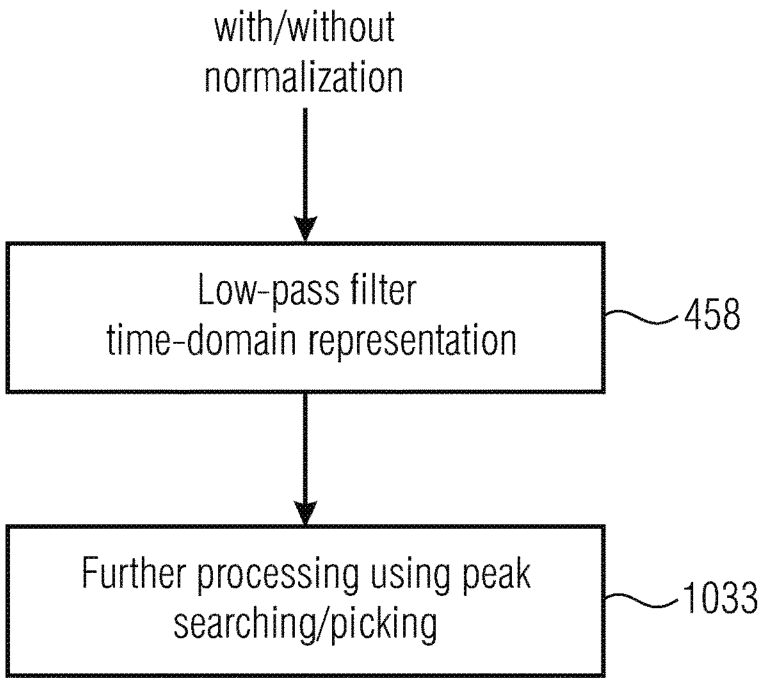
FIG. 11*b* illustrates further procedures performed by the processor in FIG. 10*a;*

As illustrated in FIG. 11*b*, an implementation of the time-domain analysis 1032 is a low-pass filtering of the time-domain representation as illustrated at 458 in FIG. 11*b* corresponding to item 458 of FIG. 4*e* and a subsequent further processing 1033 using a peak searching/peak picking operation within the low-pass filtered time-domain representation.

Figure 11C:
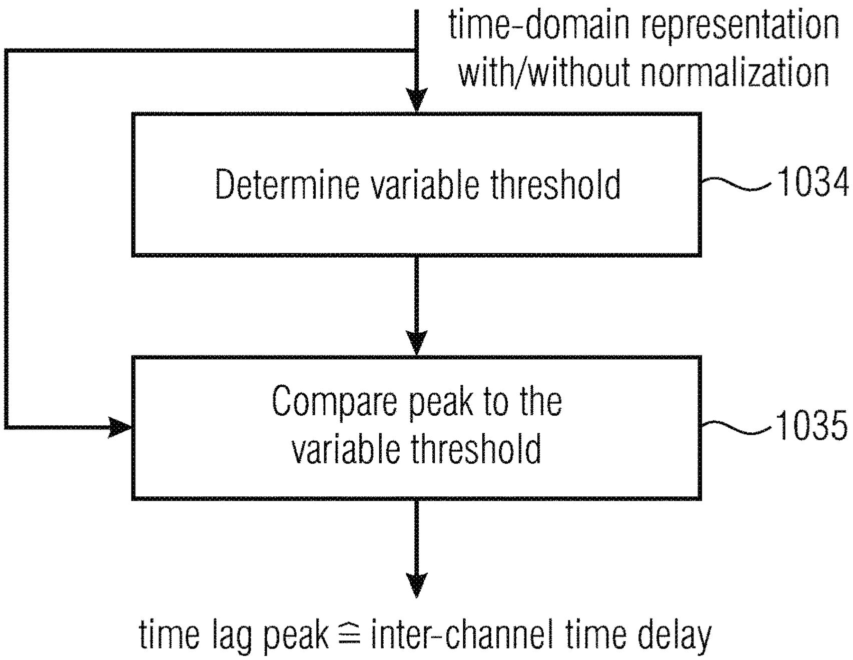
FIG. 11*c* illustrates a further implementation of the calculation of a variable threshold and the usage of the variable threshold in the analysis of the time-domain representation.

As illustrated in FIG. 11*c*, the implementation of the peak picking or peak searching operation is to perform this operation using a variable threshold. Particularly, the processor is configured to perform the peak searching/peak picking operation within the time-domain representation derived from the smoothed cross-correlation spectrum by determining 1034 a variable threshold from the time-domain representation and by comparing a peak or several peaks of the time-domain representation (obtained with or without spectral normalization) to the variable threshold, wherein the inter-channel time difference is determined as a time lag associated with a peak being in a predetermined relation to the threshold such as being greater than the variable threshold.

Figure 11D:
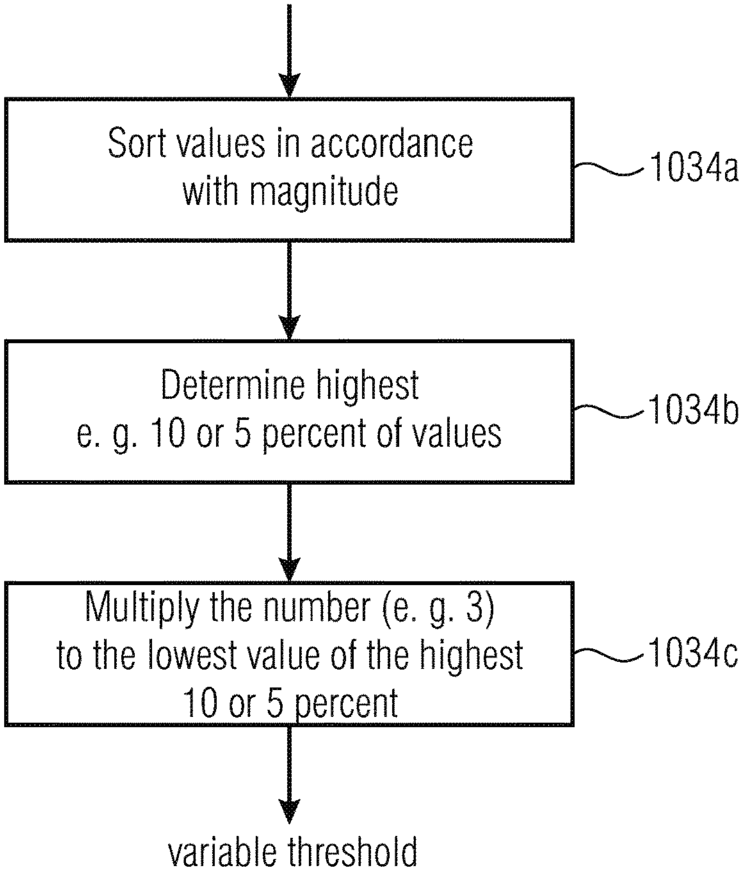
FIG. 11*d* illustrates a first embodiment for the determination of the variable threshold.

As illustrated in FIG. 11*d*, one embodiment illustrated in the pseudo code related to FIG. 4*e-b* described later on consists in the sorting 1034*a* of values in accordance with their magnitude. Then, as illustrated in item 1034*b* in FIG. 11*d*, the highest for example 10 or 5% of the values are determined.

Then, as illustrated in step 1034*c*, a number such as the number 3 is multiplied to the lowest value of the highest 10 or 5% in order to obtain the variable threshold.

As stated, advantageously, the highest 10 or 5% are determined, but it can also be useful to determine the lowest number of the highest 50% of the values and to use a higher multiplication number such as 10. Naturally, even a smaller amount such as the highest 3% of the values are determined and the lowest value among these highest 3% of the values is then multiplied by a number which is, for example, equal to 2.5 or 2, i.e., lower than 3. Thus, different combinations of numbers and percentages can be used in the embodiment illustrated in FIG. 11*d*. Apart from the percentages, the numbers can also vary, and numbers greater than 1.5 are advantageous.

Figure 11E:
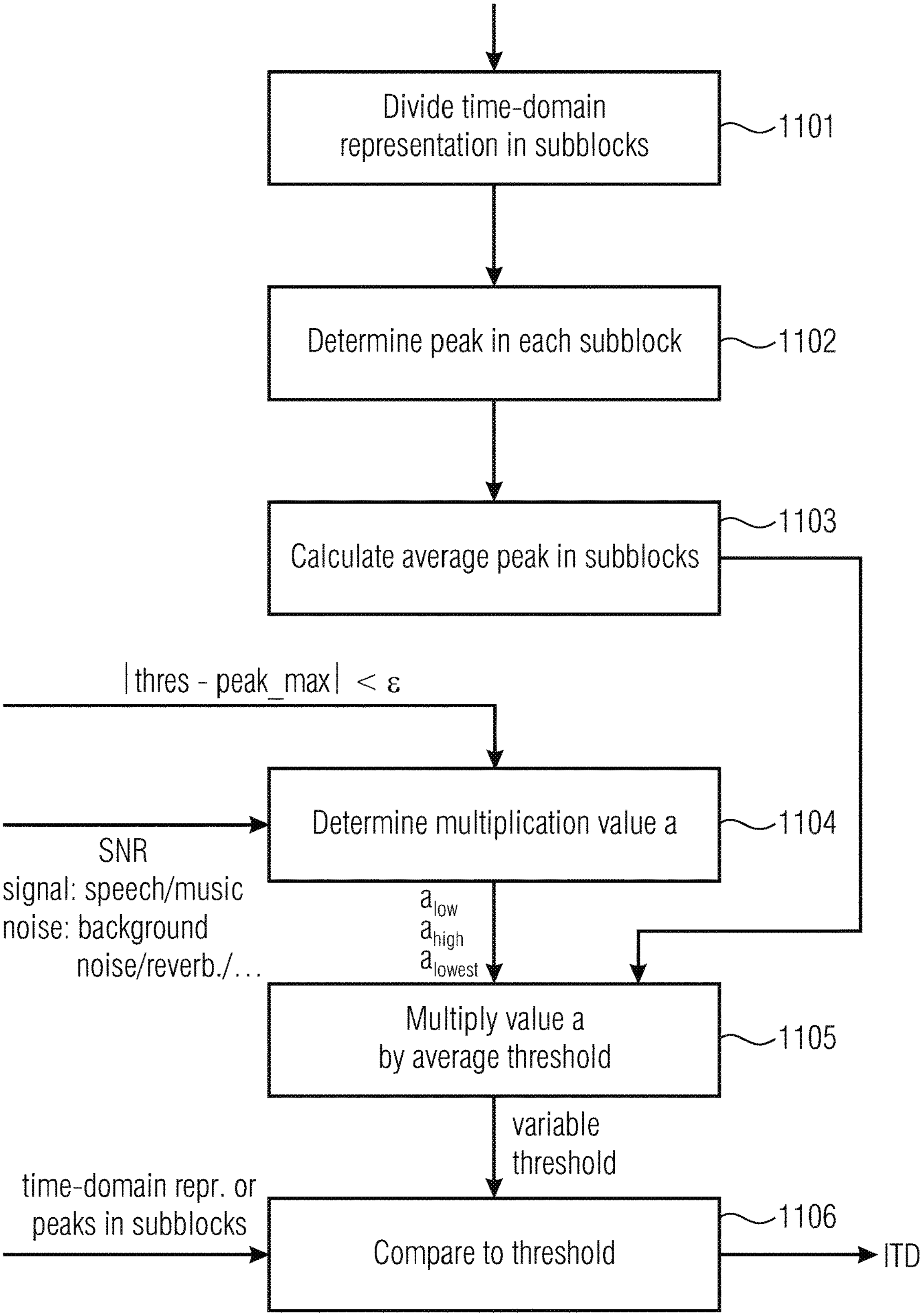
FIG. 11*e* illustrates a further implementation of the determination of the threshold.
Figure 13:
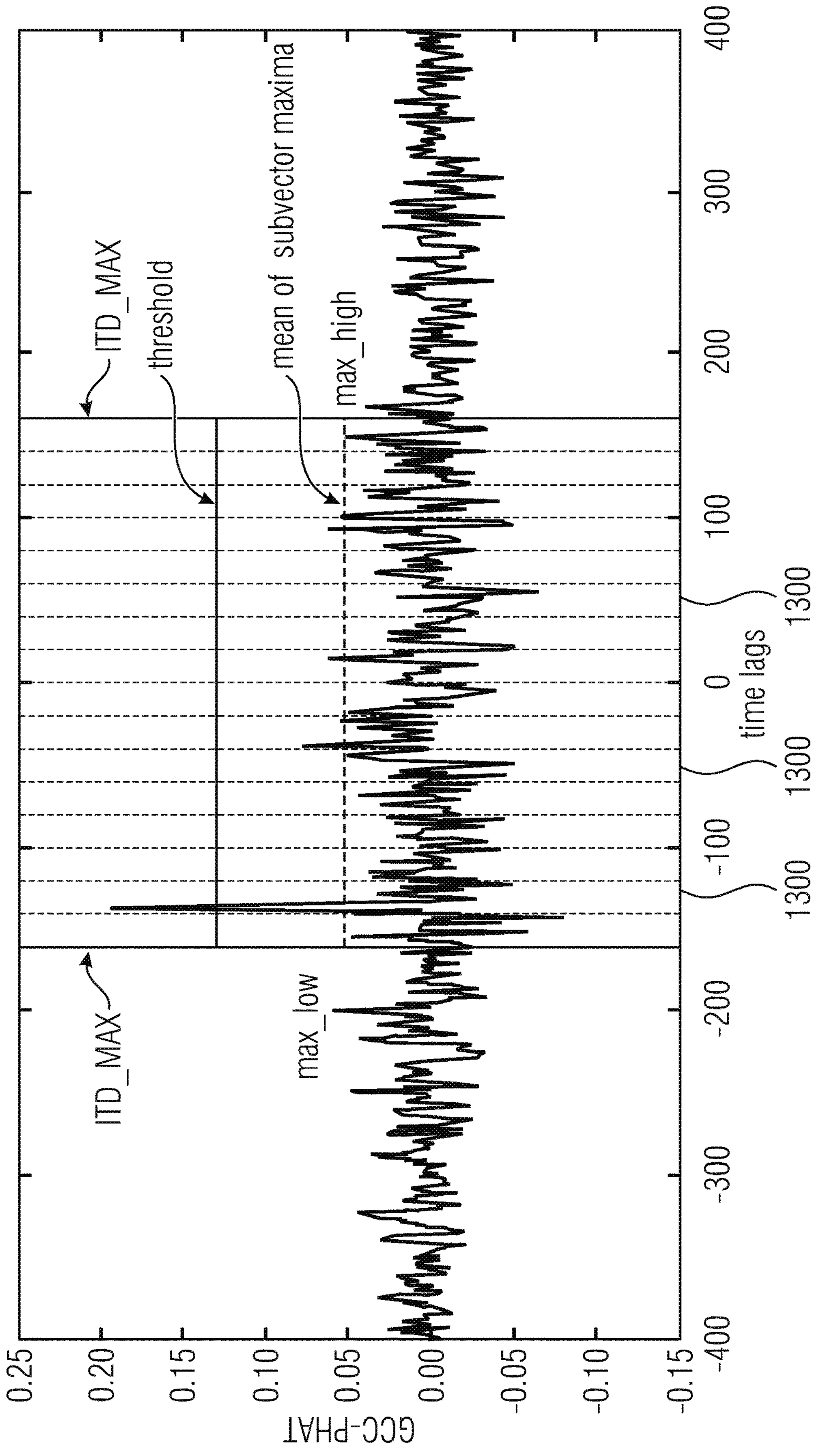
FIG. 13 illustrates a time-domain representation of a smoothed cross-correlation spectrum for a speech signal having noise and ambiance.

In a further embodiment illustrated in FIG. 11*e*, the time-domain representation is divided into subblocks as illustrated by block 1101, and these subblocks are indicated in FIG. 13 at 1300. Here, about 16 subblocks are used for the valid range so that each subblock has a time lag span of 20. However, the number of subblocks can be greater than this value or lower and advantageously greater than 3 and lower than 50.

In step 1102 of FIG. 11*e*, the peak in each subblock is determined, and in step 1103, the average peak in all the subblocks is determined. Then, in step 1104, a multiplication value a is determined that depends on a signal-to-noise ratio on the one hand and, in a further embodiment, depends on the difference between the threshold and the maximum peak as indicated to the left of block 1104. Depending on these input values, one of advantageously three different multiplication values is determined where the multiplication value can be equal to $a_{low}$, $a_{high}$ and $a_{lowest}$.

Then, in step 1105, the multiplication value a determined in block 1104 is multiplied by the average threshold in order to obtain the variable threshold that is then used in the comparison operation in block 1106. For the comparison operation, once again the time-domain representation input into block 1101 can be used or the already determined peaks in each subblock as outlined in block 1102 can be used.

Subsequently, further embodiments regarding the evaluation and detection of a peak within the time-domain cross-correlation function is outlined.

The evaluation and detection of a peak within the time-domain cross correlation function resulting from the generalized cross-correlation (GCC-PHAT) method in order to estimate the Inter-channel Time Difference (ITD) is not always straightforward due to different input scenarios. Clean speech input can result to a low deviation cross-correlation function with a strong peak, while speech in a noisy reverberant environment can produce a vector with high deviation and peaks with lower but still outstanding magnitude indicating the existence of ITD. A peak detection algorithm that is adaptive and flexible to accommodate different input scenarios is described.

Due to delay constraints, the overall system can handle channel time alignment up to a certain limit, namely ITD_MAX. The proposed algorithm is designed to detect whether a valid ITD exists in the following cases:

- Valid ITD due to outstanding peak. An outstanding peak within the [−ITD_MAX, ITD_MAX] bounds of the cross-correlation function is present.
- No correlation. When there is no correlation between the two channels, there is no outstanding peak. A threshold should be defined, above which the peak is strong enough to be considered as a valid ITD value. Otherwise, no ITD handling should be signaled, meaning ITD is set to zero and no time alignment is performed.
- Out of bounds ITD. Strong peaks of the cross-correlation function outside the region [−ITD_MAX, ITD_MAX] should be evaluated in order to determine whether ITDs that lie outside the handling capacity of the system exist. In this case no ITD handling should be signaled and thus no time alignment is performed.

To determine whether the magnitude of a peak is high enough to be considered as a time difference value, a suitable threshold needs to be defined. For different input scenarios, the cross-correlation function output varies depending on different parameters, e.g. the environment (noise, reverberation etc.), the microphone setup (AB, M/S, etc.). Therefore, to adaptively define the threshold is essential.

In the proposed algorithm, the threshold is defined by first calculating the mean of a rough computation of the envelope of the magnitude of the cross-correlation function within the [−ITD_MAX, ITD_MAX] region (FIG. 13), the average is then weighted accordingly depending on the SNR estimation.

The step-by-step description of the algorithm is described below.

Figure 12:
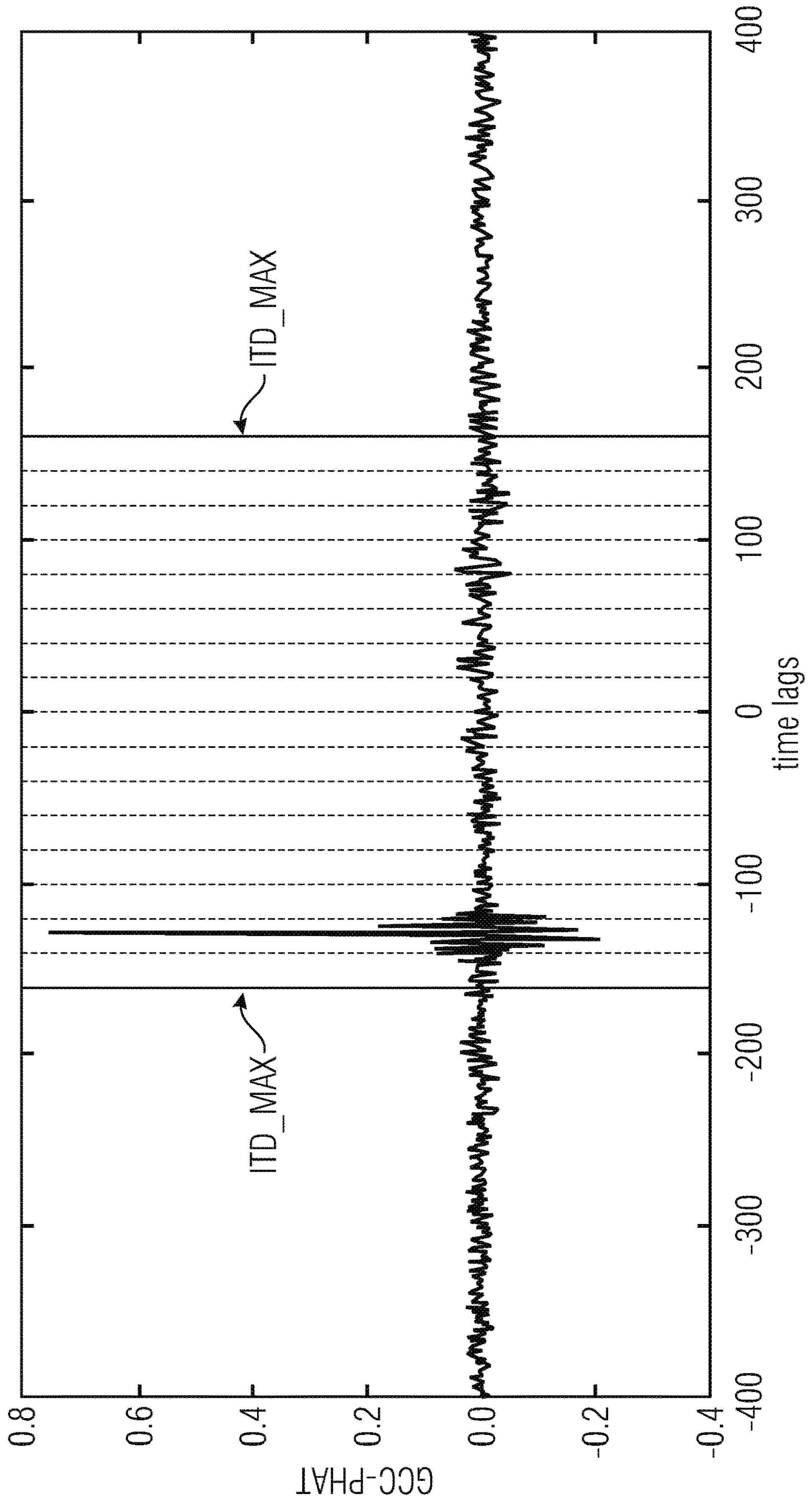
FIG. 12 illustrates a time-domain representation for a smoothed cross-correlation spectrum for a clean speech signal.

The output of the inverse DFT of the GCC-PHAT, which represents the time-domain cross-correlation, is rearranged from negative to positive time lags (FIG. 12).

The cross-correlation vector is divided in three main areas: the area of interest namely [−ITD_MAX, ITD_MAX] and the area outside the ITD_MAX bounds, namely time lags smaller than −ITD_MAX (max_low) and higher than ITD_MAX (max_high). The maximum peaks of the "out of bound" areas are detected and saved to be compared to the maximum peak detected in the area of interest.

In order to determine whether a valid ITD is present, the sub-vector area [−ITD_MAX, ITD_MAX] of the cross-correlation function is considered. The sub-vector is divided into N sub-blocks (FIG. 13).

For each sub-block the maximum peak magnitude peak_sub and the equivalent time lag position index_sub is found and saved.

The maximum of the local maxima peak_max is determined and will be compared to the threshold to determine the existence of a valid ITD value.

The maximum value peak_max is compared to max_low and max_high. If peak_max is lower than either of the two then no itd handling is signaled and no time alignment is performed. Because of the ITD handling limit of the system, the magnitudes of the out of bound peaks do not need to be evaluated.

The mean of the magnitudes of the peaks is calculated:

$$\text{peak}_{mean} = \frac{\sum_{N} \text{peak\_sub}}{N}$$

The threshold thres is then computed by weighting $\text{peak}_{mean}$ with an SNR depended weighting factor $a_w$:

$$thres = a_w \text{peak}_{mean}, \text{ where } a_w = \begin{cases} a_{low} & SNR \le SNR_{threshold} \\ a_{high}, & SNR > SNR_{threshold} \end{cases}$$

In cases where $SNR \ll SNR_{threshold}$ and $|thres - peak\_max| < \varepsilon$, the peak magnitude is also compared to a slightly more relaxed threshold ($a_w = a_{lowest}$), in order to avoid rejecting an outstanding peak with high neighboring peaks. The weighting factors could be for example $a_{high}=3$, $a_{low}=2.5$ and $a_{lowest}=2$, while the $SNR_{threshold}$ could be for example 20 dB and the bound $\varepsilon=0.05$.

Advantageous ranges are 2.5 to 5 for $a_{high}$; 1.5 to 4 for $a_{low}$; 1.0 to 3 for $a_{lowest}$; 10 to 30 dB for $SNR_{threshold}$; and 0.01 to 0.5 for $\varepsilon$, where $a_{high}$ is greater than $a_{low}$ that is greater than $a_{lowest}$.

If peak_max>thres the equivalent time lag is returned as the estimated ITD, elsewise no itd handling is signaled (ITD=0). Further embodiments are described later on with respect to FIG. 4*e*.

Figure 11F:
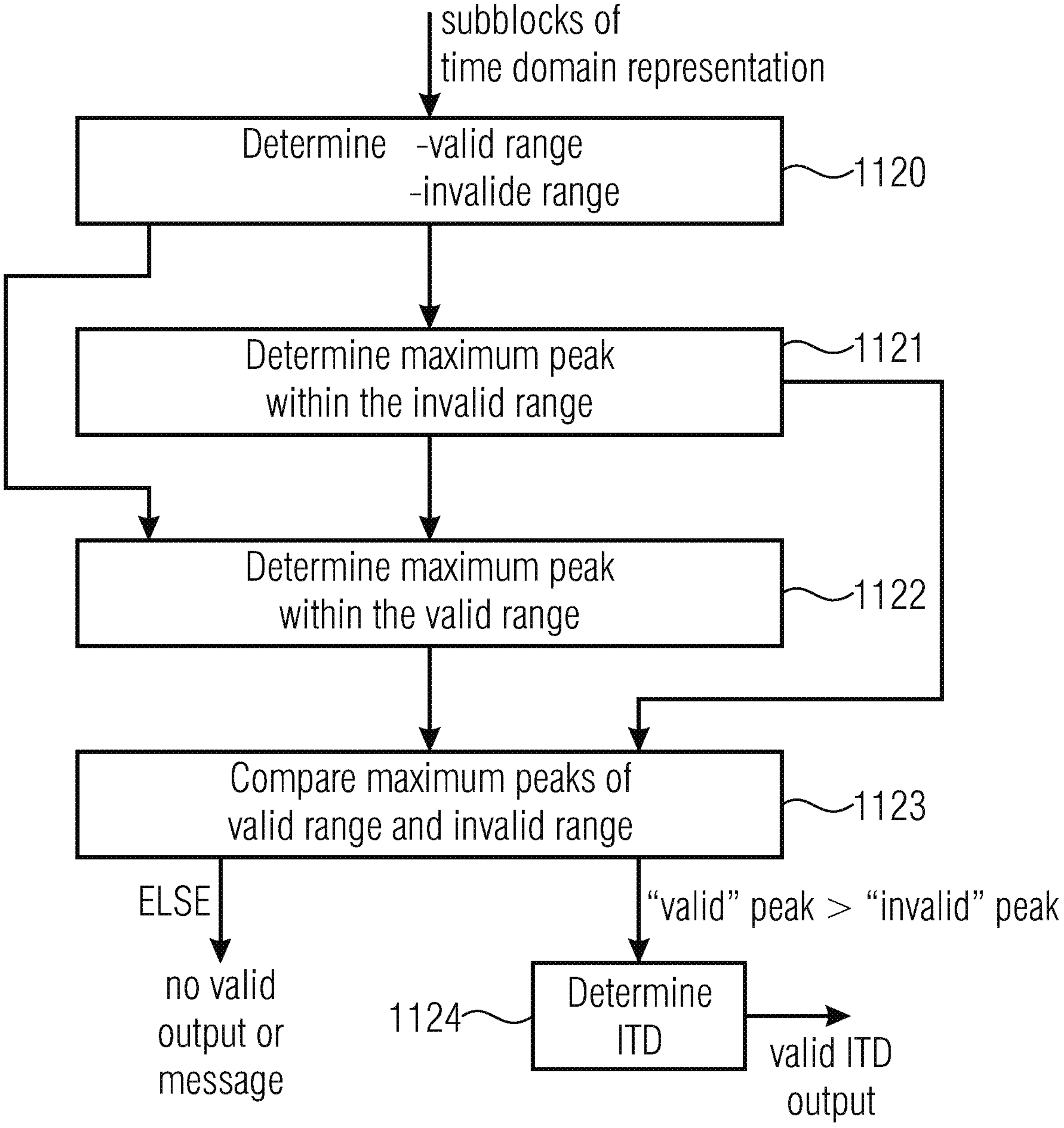
FIG. 11*f* illustrates a schematic representation of the processor in accordance with embodiments of the invention.

FIG. 11*f* illustrates the implementation of determining a valid ITD (inter-channel time difference) output.

Subblocks of the time domain representation of the weighted and smoothed or non-smoothed cross-correlation spectrum are input into a determination step within the processor 1040. This determination step 1120 determines a valid range and an invalid range within a time-domain representation derived from the weighted and smoothed or non-smoothed cross-correlation spectrum. In step 1121, a maximum peak is determined within the invalid range, and in step 1122, a maximum peak is determined within the valid range. Particularly, at least one maximum peak is determined within the invalid range and at least one maximum peak is determined within the valid range. In block 1123, the maximum peaks of the valid range and the invalid range are compared. In case the valid peak, i.e., the maximum peak in the valid range is greater than the "invalid peak", the maximum peak in the invalid range, then an ITD determination 1124 is actually performed and a valid ITD output is provided. When, however, it is detected that an "invalid peak" is greater than the "valid peak" or that the invalid peak has the same size as the valid peak, then a valid output is not provided and, advantageously, an error message or any comparable action is performed in order to bring this to the processor's attention.

Subsequently, an implementation of the present invention within block 1050 of FIG. 10*b* for the purpose of a signal further processor is discussed with respect to FIGS. 1 to 9*e*, i.e., in the context of a stereo/multi-channel processing/encoding and time alignment of two channels.

However, as stated and as illustrated in FIG. 10*b*, many other fields exist, where a signal further processing using the determined inter-channel time difference can be performed as well.

Figure 1:
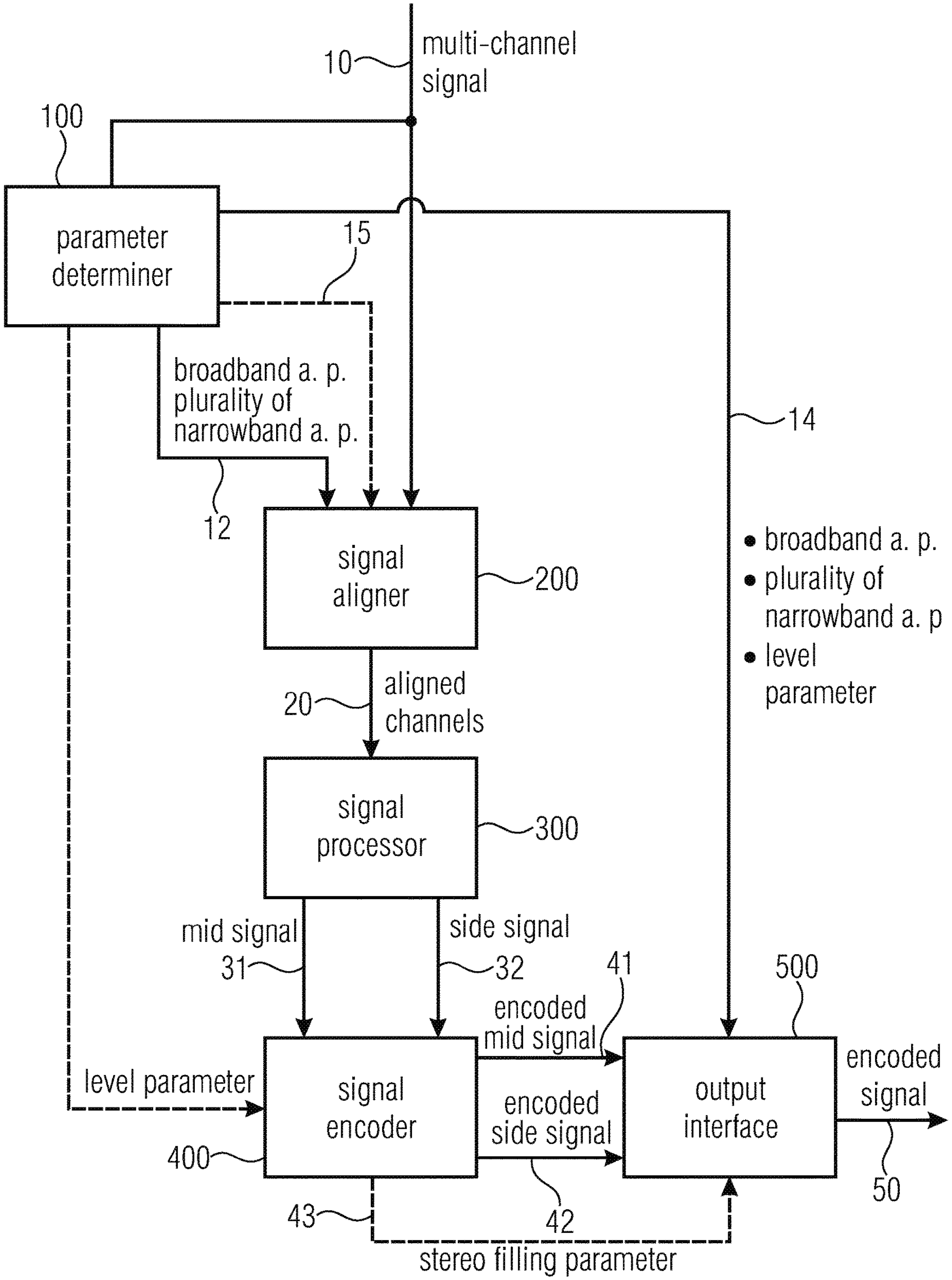
FIG. 1 is a block diagram of an implementation of an apparatus for encoding a multi-channel signal.

FIG. 1 illustrates an apparatus for encoding a multi-channel signal having at least two channels. The multi-channel signal 10 is input into a parameter determiner 100 on the one hand and a signal aligner 200 on the other hand. The parameter determiner 100 determines, on the one hand, a broadband alignment parameter and, on the other hand, a plurality of narrowband alignment parameters from the multi-channel signal. These parameters are output via a parameter line 12. Furthermore, these parameters are also output via a further parameter line 14 to an output interface 500 as illustrated. On the parameter line 14, additional parameters such as the level parameters are forwarded from the parameter determiner 100 to the output interface 500. The signal aligner 200 is configured for aligning the at least two channels of the multi-channel signal 10 using the broadband alignment parameter and the plurality of narrowband alignment parameters received via parameter line 10 to obtain aligned channels 20 at the output of the signal aligner 200. These aligned channels 20 are forwarded to a signal processor 300 which is configured for calculating a mid-signal 31 and a side signal 32 from the aligned channels received via line 20. The apparatus for encoding further comprises a signal encoder 400 for encoding the mid-signal from line 31 and the side signal from line 32 to obtain an encoded mid-signal on line 41 and an encoded side signal on line 42. Both these signals are forwarded to the output interface 500 for generating an encoded multi-channel signal at output line 50. The encoded signal at output line 50 comprises the encoded mid-signal from line 41, the encoded side signal from line 42, the narrowband alignment parameters and the broadband alignment parameters from line 14 and, optionally, a level parameter from line 14 and, additionally optionally, a stereo filling parameter generated by the signal encoder 400 and forwarded to the output interface 500 via parameter line 43.

Advantageously, the signal aligner is configured to align the channels from the multichannel signal using the broadband alignment parameter, before the parameter determiner 100 actually calculates the narrowband parameters. Therefore, in this embodiment, the signal aligner 200 sends the broadband aligned channels back to the parameter determiner 100 via a connection line 15. Then, the parameter determiner 100 determines the plurality of narrowband alignment parameters from an already with respect to the broadband characteristic aligned multi-channel signal. In other embodiments, however, the parameters are determined without this specific sequence of procedures.

FIG. 4*a* illustrates an implementation, where the specific sequence of steps that incurs connection line 15 is performed. In the step 16, the broadband alignment parameter is determined using the two channels and the broadband alignment parameter such as an inter-channel time difference or ITD parameter is obtained. Then, in step 21, the two channels are aligned by the signal aligner 200 of FIG. 1 using the broadband alignment parameter. Then, in step 17, the narrowband parameters are determined using the aligned channels within the parameter determiner 100 to determine a plurality of narrowband alignment parameters such as a plurality of inter-channel phase difference parameters for different bands of the multi-channel signal. Then, in step 22, the spectral values in each parameter band are aligned using the corresponding narrowband alignment parameter for this specific band. When this procedure in step 22 is performed for each band, for which a narrowband alignment parameter is available, then aligned first and second or left/right channels are available for further signal processing by the signal processor 300 of FIG. 1.

FIG. 4*b* illustrates a further implementation of the multi-channel encoder of FIG. 1 where several procedures are performed in the frequency domain.

Specifically, the multi-channel encoder further comprises a time-spectrum converter 150 for converting a time domain multi-channel signal into a spectral representation of the at least two channels within the frequency domain.

Furthermore, as illustrated at 152, the parameter determiner, the signal aligner and the signal processor illustrated at 100, 200 and 300 in FIG. 1 all operate in the frequency domain.

Furthermore, the multi-channel encoder and, specifically, the signal processor further comprises a spectrum-time converter 154 for generating a time domain representation of the mid-signal at least.

Advantageously, the spectrum time converter additionally converts a spectral representation of the side signal also determined by the procedures represented by block 152 into a time domain representation, and the signal encoder 400 of FIG. 1 is then configured to further encode the mid-signal and/or the side signal as time domain signals depending on the specific implementation of the signal encoder 400 of FIG. 1.

Advantageously, the time-spectrum converter 150 of FIG. 4*b* is configured to implement steps 155, 156 and 157 of FIG. 4*c*. Specifically, step 155 comprises providing an analysis window with at least one zero padding portion at one end thereof and, specifically, a zero padding portion at the initial window portion and a zero padding portion at the terminating window portion as illustrated, for example, in FIG. 7 later on. Furthermore, the analysis window additionally has overlap ranges or overlap portions at a first half of the window and at a second half of the window and, additionally, advantageously a middle part being a non-overlap range as the case may be.

In step 156, each channel is windowed using the analysis window with overlap ranges. Specifically, each channel is windowed using the analysis window in such a way that a first block of the channel is obtained. Subsequently, a second block of the same channel is obtained that has a certain overlap range with the first block and so on, such that subsequent to, for example, five windowing operations, five blocks of windowed samples of each channel are available that are then individually transformed into a spectral representation as illustrated at 157 in FIG. 4*c*. The same procedure is performed for the other channel as well so that, at the end of step 157, a sequence of blocks of spectral values and, specifically, complex spectral values such as DFT spectral values or complex subband samples is available.

In step 158, which is performed by the parameter determiner 100 of FIG. 1, a broadband alignment parameter is determined and in step 159, which is performed by the signal alignment 200 of FIG. 1, a circular shift is performed using the broadband alignment parameter. In step 160, again performed by the parameter determiner 100 of FIG. 1, narrowband alignment parameters are determined for individual bands/subbands and in step 161, aligned spectral values are rotated for each band using corresponding narrowband alignment parameters determined for the specific bands.

FIG. 4*d* illustrates further procedures performed by the signal processor 300. Specifically, the signal processor 300 is configured to calculate a mid-signal and a side signal as illustrated at step 301. In step 302, some kind of further processing of the side signal can be performed and then, in step 303, each block of the mid-signal and the side signal is transformed back into the time domain and, in step 304, a synthesis window is applied to each block obtained by step 303 and, in step 305, an overlap add operation for the mid-signal on the one hand and an overlap add operation for the side signal on the other hand is performed to finally obtain the time domain mid/side signals.

Specifically, the operations of the steps 304 and 305 result in a kind of cross fading from one block of the mid-signal or the side signal in the next block of the mid signal and the side signal is performed so that, even when any parameter changes occur such as the inter-channel time difference parameter or the inter-channel phase difference parameter occur, this will nevertheless be not audible in the time domain mid/side signals obtained by step 305 in FIG. 4*d*.

Figure 6A:
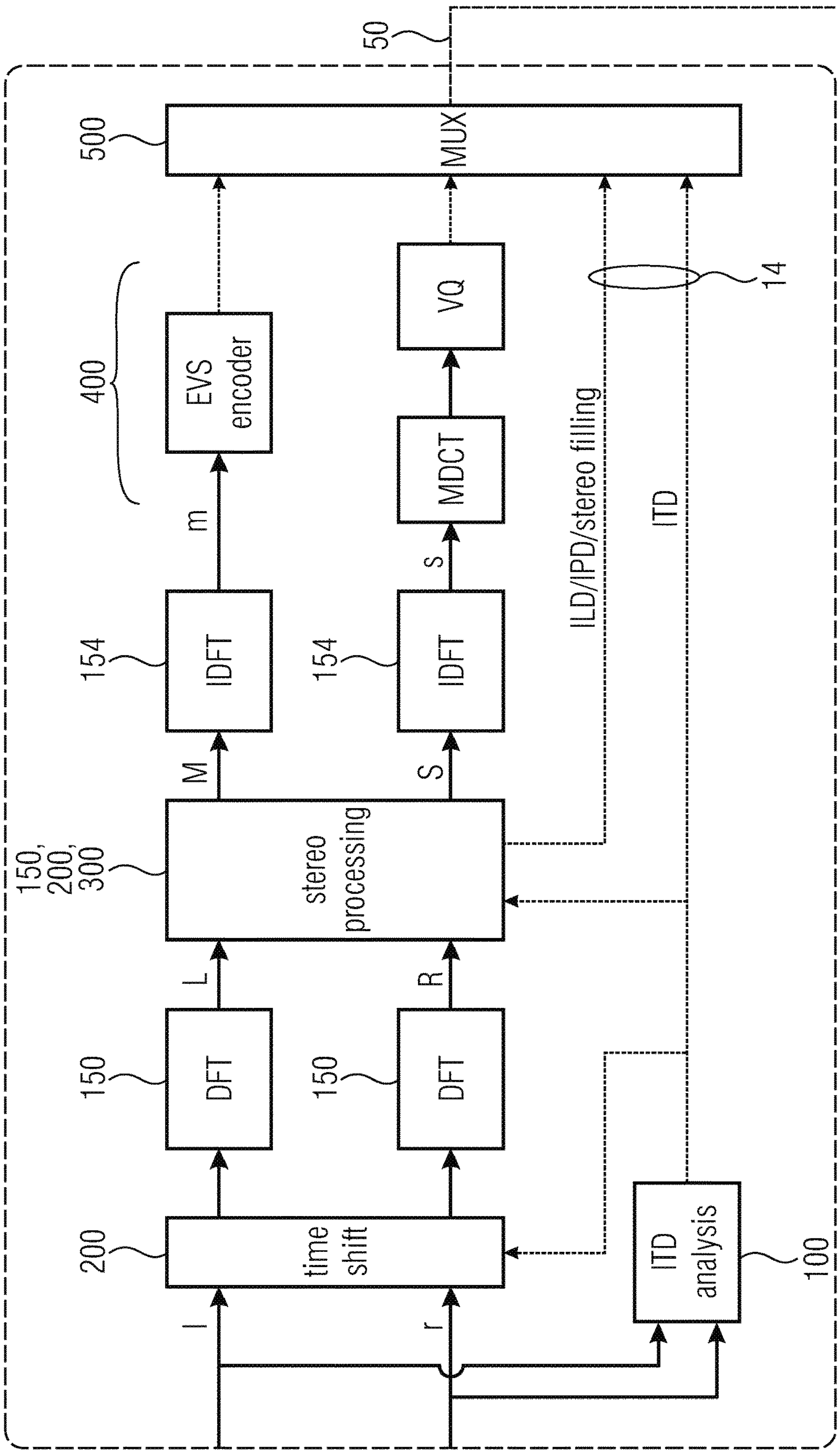
FIG. 6*a* illustrates a block chart of an embodiment of an encoder.
Figure 6B:
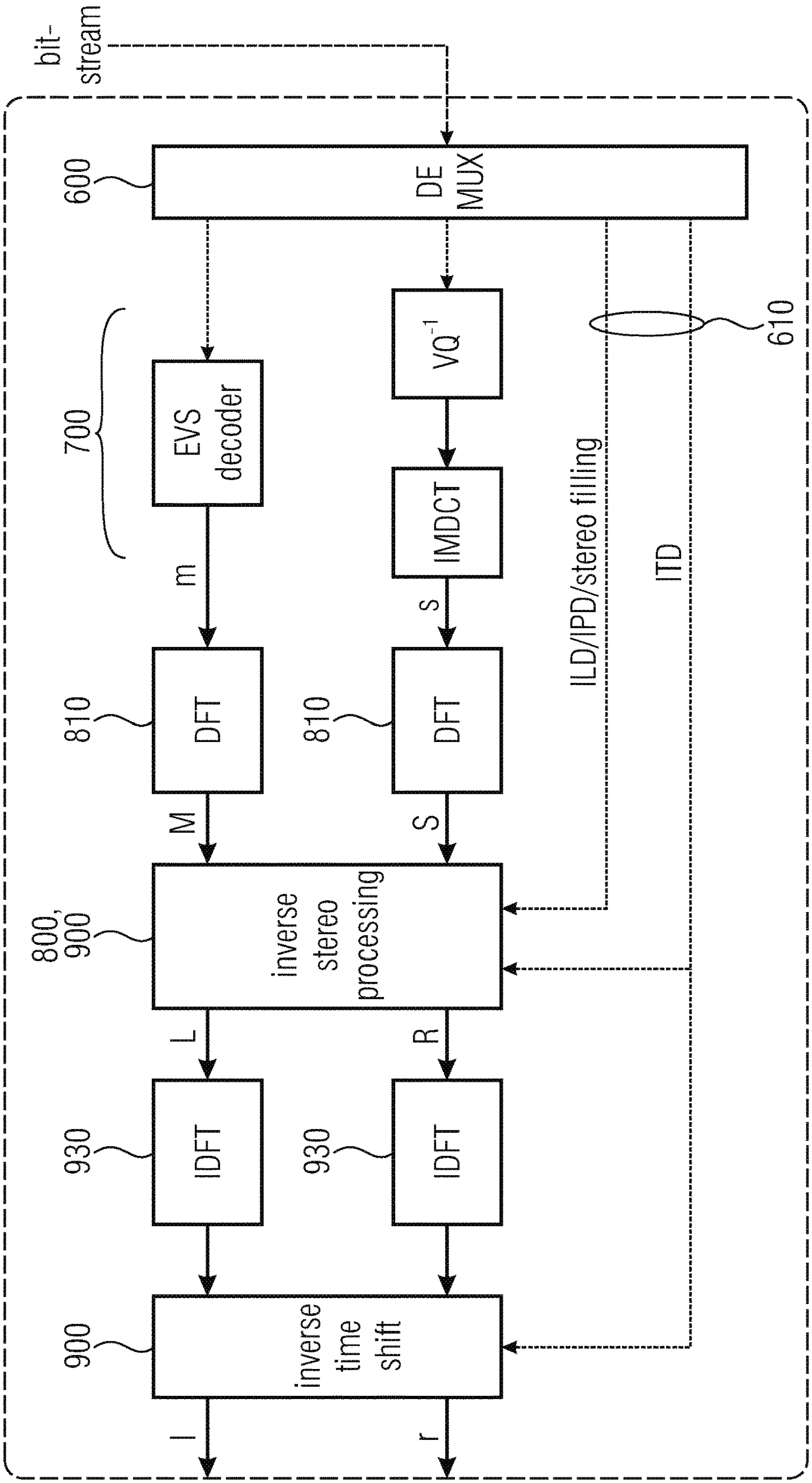
FIG. 6*b* illustrates a flowchart of a corresponding embodiment of a decoder.

The new low-delay stereo coding is a joint Mid/Side (M/S) stereo coding exploiting some spatial cues, where the Mid-channel is coded by a primary mono core coder, and the Side-channel is coded in a secondary core coder. The encoder and decoder principles are depicted in FIGS. 6*a*, 6*b*.

The stereo processing is performed mainly in Frequency Domain (FD). Optionally some stereo processing can be performed in Time Domain (TD) before the frequency analysis. It is the case for the ITD computation, which can be computed and applied before the frequency analysis for aligning the channels in time before pursuing the stereo analysis and processing. Alternatively, ITD processing can be done directly in frequency domain. Since usual speech coders like ACELP do not contain any internal time-frequency decomposition, the stereo coding adds an extra complex modulated filter-bank by means of an analysis and synthesis filter-bank before the core encoder and another stage of analysis-synthesis filter-bank after the core decoder. In the embodiment, an oversampled DFT with a low overlapping region is employed. However, in other embodiments, any complex valued time-frequency decomposition with similar temporal resolution can be used.

The stereo processing consists of computing the spatial cues: inter-channel Time Difference (ITD), the inter-channel Phase Differences (IPDs) and inter-channel Level Differences (ILDs). ITD and IPDs are used on the input stereo signal for aligning the two channels L and R in time and in phase. ITD is computed in broadband or in time domain while IPDs and ILDs are computed for each or a part of the parameter bands, corresponding to a non-uniform decomposition of the frequency space. Once the two channels are aligned a joint M/S stereo is applied, where the Side signal is then further predicted from the Mid signal. The prediction gain is derived from the ILDs.

The Mid signal is further coded by a primary core coder. In the embodiment, the primary core coder is the 3GPP EVS standard, or a coding derived from it which can switch between a speech coding mode, ACELP, and a music mode based on a MDCT transformation. Advantageously, ACELP and the MDCT-based coder are supported by a Time Domain BandWidth Extension (TD-BWE) and or Intelligent Gap Filling (IGF) modules respectively.

The Side signal is first predicted by the Mid channel using prediction gains derived from ILDs. The residual can be further predicted by a delayed version of the Mid signal or directly coded by a secondary core coder, performed in the embodiment in MDCT domain. The stereo processing at encoder can be summarized by FIG. 5 as will be explained later on.

Figure 2:
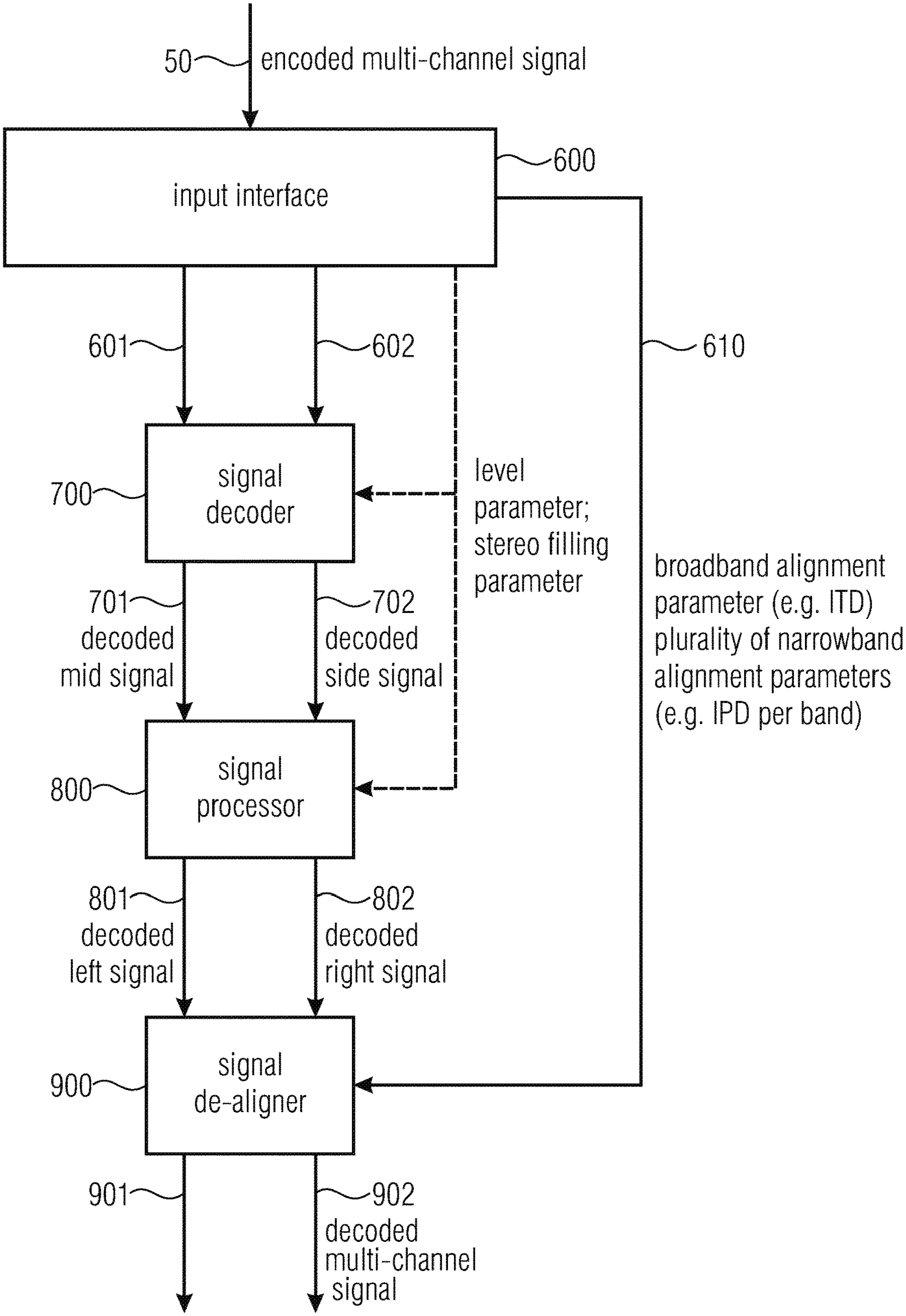
FIG. 2 is an embodiment of an apparatus for decoding an encoded multi-channel signal.

FIG. 2 illustrates a block diagram of an embodiment of an apparatus for decoding an encoded multi-channel signal received at input line 50.

In particular, the signal is received by an input interface 600. Connected to the input interface 600 are a signal decoder 700, and a signal de-aligner 900. Furthermore, a signal processor 800 is connected to a signal decoder 700 on the one hand and is connected to the signal de-aligner on the other hand.

In particular, the encoded multi-channel signal comprises an encoded mid-signal, an encoded side signal, information on the broadband alignment parameter and information on the plurality of narrowband parameters. Thus, the encoded multi-channel signal on line 50 can be exactly the same signal as output by the output interface of 500 of FIG. 1.

However, importantly, it is to be noted here that, in contrast to what is illustrated in FIG. 1, the broadband alignment parameter and the plurality of narrowband alignment parameters included in the encoded signal in a certain form can be exactly the alignment parameters as used by the signal aligner 200 in FIG. 1 but can, alternatively, also be the inverse values thereof, i.e., parameters that can be used by exactly the same operations performed by the signal aligner 200 but with inverse values so that the de-alignment is obtained.

Thus, the information on the alignment parameters can be the alignment parameters as used by the signal aligner 200 in FIG. 1 or can be inverse values, i.e., actual "de-alignment parameters". Additionally, these parameters will typically be quantized in a certain form as will be discussed later on with respect to FIG. 8.

The input interface 600 of FIG. 2 separates the information on the broadband alignment parameter and the plurality of narrowband alignment parameters from the encoded mid/side signals and forwards this information via parameter line 610 to the signal de-aligner 900. On the other hand, the encoded mid-signal is forwarded to the signal decoder 700 via line 601 and the encoded side signal is forwarded to the signal decoder 700 via signal line 602.

The signal decoder is configured for decoding the encoded mid-signal and for decoding the encoded side signal to obtain a decoded mid-signal on line 701 and a decoded side signal on line 702. These signals are used by the signal processor 800 for calculating a decoded first channel signal or decoded left signal and for calculating a decoded second channel or a decoded right channel signal from the decoded mid signal and the decoded side signal, and the decoded first channel and the decoded second channel are output on lines 801, 802, respectively. The signal de-aligner 900 is configured for de-aligning the decoded first channel on line 801 and the decoded right channel 802 using the information on the broadband alignment parameter and additionally using the information on the plurality of narrowband alignment parameters to obtain a decoded multi-channel signal, i.e., a decoded signal having at least two decoded and de-aligned channels on lines 901 and 902.

Figure 9A:
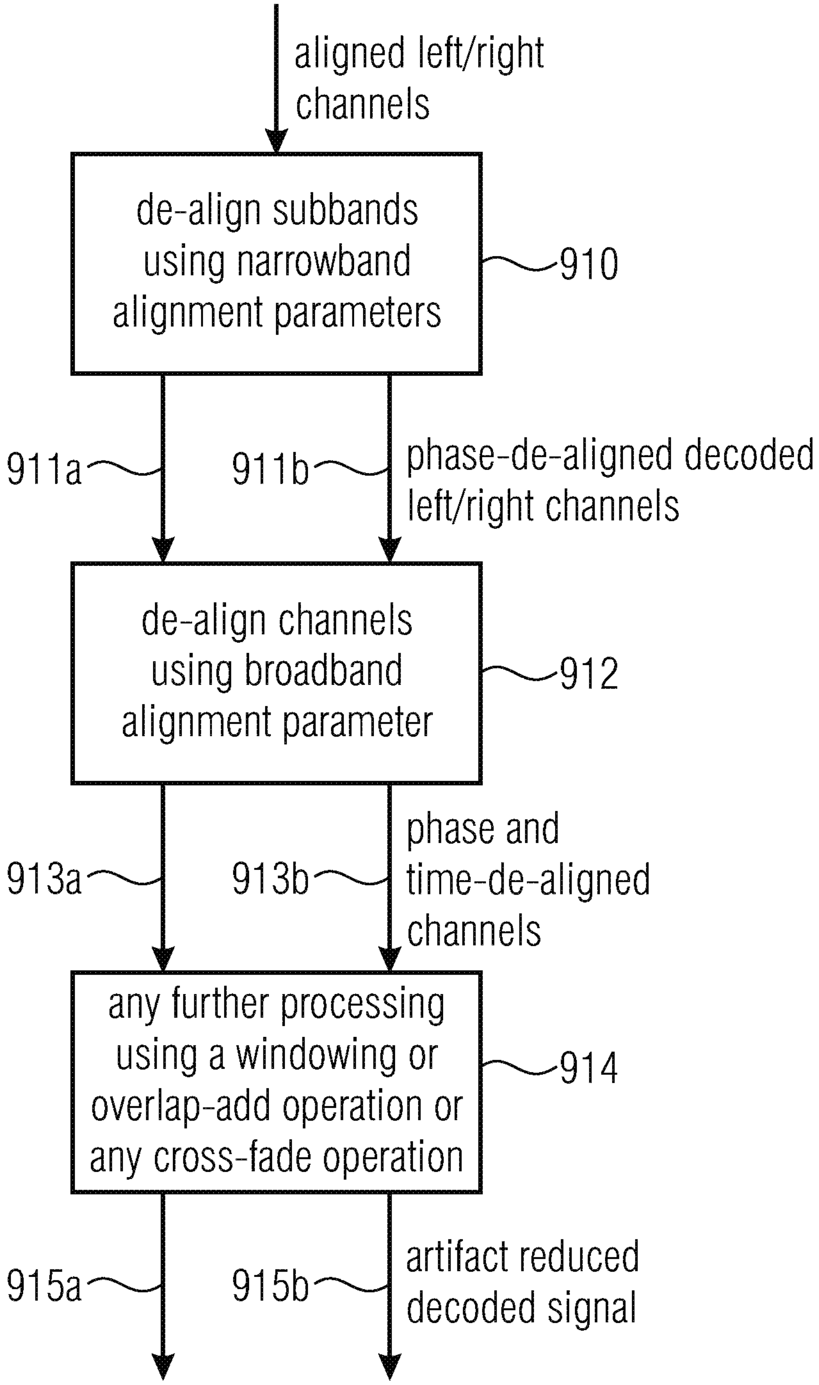
FIG. 9*a* illustrates procedures performed by an apparatus for decoding an encoded multi-channel signal in an embodiment.

FIG. 9*a* illustrates a sequence of steps performed by the signal de-aligner 900 from FIG. 2. Specifically, step 910 receives aligned left and right channels as available on lines 801, 802 from FIG. 2. In step 910, the signal de-aligner 900 de-aligns individual subbands using the information on the narrowband alignment parameters in order to obtain phase-de-aligned decoded first and second or left and right channels at 911*a* and 911 *b*. In step 912, the channels are de-aligned using the broadband alignment parameter so that, at 913*a* and 913*b*, phase and time-de-aligned channels are obtained.

In step 914, any further processing is performed that comprises using a windowing or any overlap-add operation or, generally, any cross-fade operation in order to obtain, at 915*a* or 915*b*, an artifact-reduced or artifact-free decoded signal, i.e., to decoded channels that do not have any artifacts although there have been, typically, time-varying de-alignment parameters for the broadband on the one hand and for the plurality of narrowbands on the other hand.

Figure 9B:
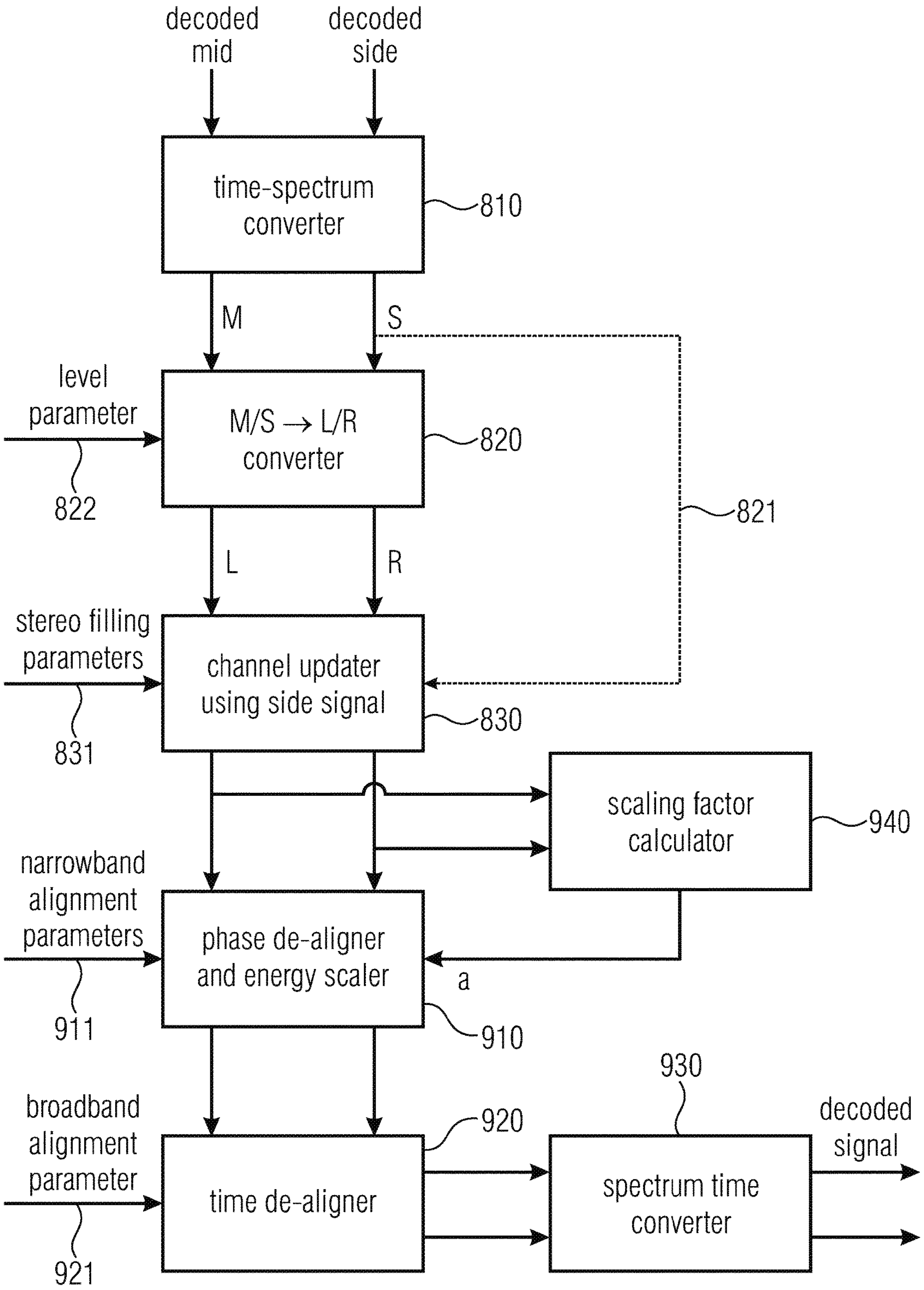
FIG. 9*b* illustrates an implementation of the apparatus for decoding an encoded multi-channel signal.

FIG. 9*b* illustrates an implementation of the multi-channel decoder illustrated in FIG. 2.

In particular, the signal processor 800 from FIG. 2 comprises a time-spectrum converter 810.

The signal processor furthermore comprises a mid/side to left/right converter 820 in order to calculate from a mid-signal M and a side signal S a left signal L and a right signal R.

However, importantly, in order to calculate L and R by the mid/side-left/right conversion in block 820, the side signal S is not necessarily to be used. Instead, as discussed later on, the left/right signals are initially calculated only using a gain parameter derived from an inter-channel level difference parameter ILD. Generally, the prediction gain can also be considered to be a form of an ILD. The gain can be derived from ILD but can also be directly computed. It is advantageous to not compute ILD anymore, but to compute the prediction gain directly and to transmit and use the prediction gain in the decoder rather than the ILD parameter.

Therefore, in this implementation, the side signal S is only used in the channel updater 830 that operates in order to provide a better left/right signal using the transmitted side signal S as illustrated by bypass line 821.

Therefore, the converter 820 operates using a level parameter obtained via a level parameter input 822 and without actually using the side signal S but the channel updater 830 then operates using the side 821 and, depending on the specific implementation, using a stereo filling parameter received via line 831. The signal aligner 900 then comprises a phased-de-aligner and energy scaler 910. The energy scaling is controlled by a scaling factor derived by a scaling factor calculator 940. The scaling factor calculator 940 is fed by the output of the channel updater 830. Based on the narrowband alignment parameters received via input 911, the phase de-alignment is performed and, in block 920, based on the broadband alignment parameter received via line 921, the time-de-alignment is performed. Finally, a spectrum-time conversion 930 is performed in order to finally obtain the decoded signal.

Figure 9C:
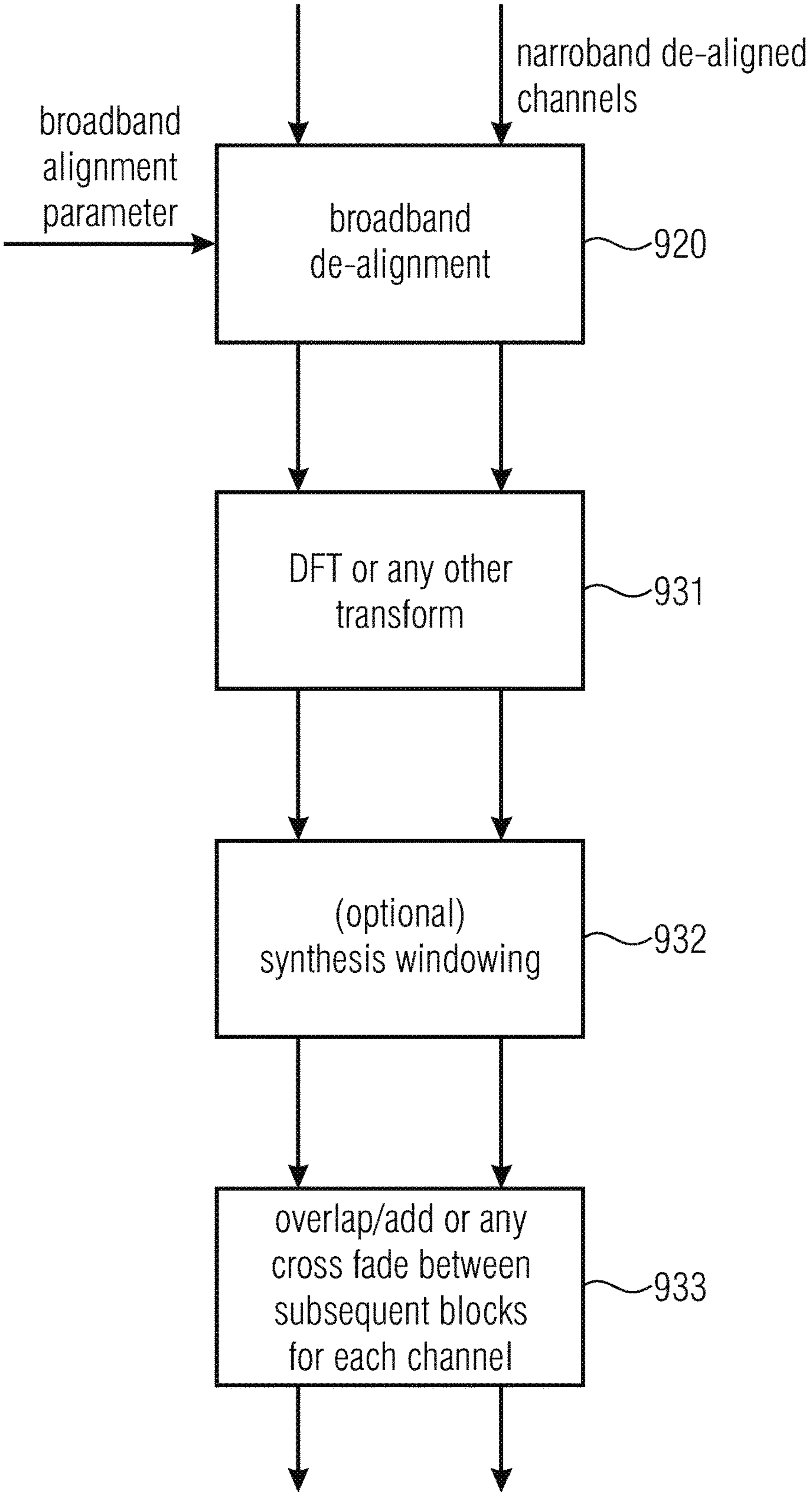
FIG. 9*c* illustrates a procedure performed in the context of a broadband de-alignment in the context of the decoding of an encoded multi-channel signal.

FIG. 9*c* illustrates a further sequence of steps typically performed within blocks 920 and 930 of FIG. 9*b* in an embodiment.

Specifically, the narrowband de-aligned channels are input into the broadband de-alignment functionality corresponding to block 920 of FIG. 9*b*. A DFT or any other transform is performed in block 931. Subsequent to the actual calculation of the time domain samples, an optional synthesis windowing using a synthesis window is performed. The synthesis window is advantageously exactly the same as the analysis window or is derived from the analysis window, for example interpolation or decimation but depends in a certain way from the analysis window. This dependence advantageously is such that multiplication factors defined by two overlapping windows add up to one for each point in the overlap range. Thus, subsequent to the synthesis window in block 932, an overlap operation and a subsequent add operation is performed. Alternatively, instead of synthesis windowing and overlap/add operation, any cross fade between subsequent blocks for each channel is performed in order to obtain, as already discussed in the context of FIG. 9*a*, an artifact reduced decoded signal.

When FIG. 6*b* is considered, it becomes clear that the actual decoding operations for the mid-signal, i.e., the "EVS decoder" on the one hand and, for the side signal, the inverse vector quantization $VQ^{-1}$ and the inverse MDCT operation (IMDCT) correspond to the signal decoder 700 of FIG. 2.

Furthermore, the DFT operations in blocks 810 correspond to element 810 in FIG. 9*b* and functionalities of the inverse stereo processing and the inverse time shift correspond to blocks 800, 900 of FIG. 2 and the inverse DFT operations 930 in FIG. 6*b* correspond to the corresponding operation in block 930 in FIG. 9*b*.

Subsequently, FIG. 3 is discussed in more detail. In particular, FIG. 3 illustrates a DFT spectrum having individual spectral lines. Advantageously, the DFT spectrum or any other spectrum illustrated in FIG. 3 is a complex spectrum and each line is a complex spectral line having magnitude and phase or having a real part and an imaginary part.

Additionally, the spectrum is also divided into different parameter bands. Each parameter band has at least one and advantageously more than one spectral lines. Additionally, the parameter bands increase from lower to higher frequencies. Typically, the broadband alignment parameter is a single broadband alignment parameter for the whole spectrum, i.e., for a spectrum comprising all the bands 1 to 6 in the exemplary embodiment in FIG. 3.

Furthermore, the plurality of narrowband alignment parameters are provided so that there is a single alignment parameter for each parameter band. This means that the alignment parameter for a band applies to all the spectral values within the corresponding band.

Furthermore, in addition to the narrowband alignment parameters, level parameters are also provided for each parameter band.

In contrast to the level parameters that are provided for each and every parameter band from band 1 to band 6, it is advantageous to provide the plurality of narrowband alignment parameters only for a limited number of lower bands such as bands 1, 2, 3 and 4.

Additionally, stereo filling parameters are provided for a certain number of bands excluding the lower bands such as, in the exemplary embodiment, for bands 4, 5 and 6, while there are side signal spectral values for the lower parameter bands 1, 2 and 3 and, consequently, no stereo filling parameters exist for these lower bands where wave form matching is obtained using either the side signal itself or a prediction residual signal representing the side signal.

As already stated, there exist more spectral lines in higher bands such as, in the embodiment in FIG. 3, seven spectral lines in parameter band 6 versus only three spectral lines in parameter band 2. Naturally, however, the number of parameter bands, the number of spectral lines and the number of spectral lines within a parameter band and also the different limits for certain parameters will be different.

Figures 7, 8:
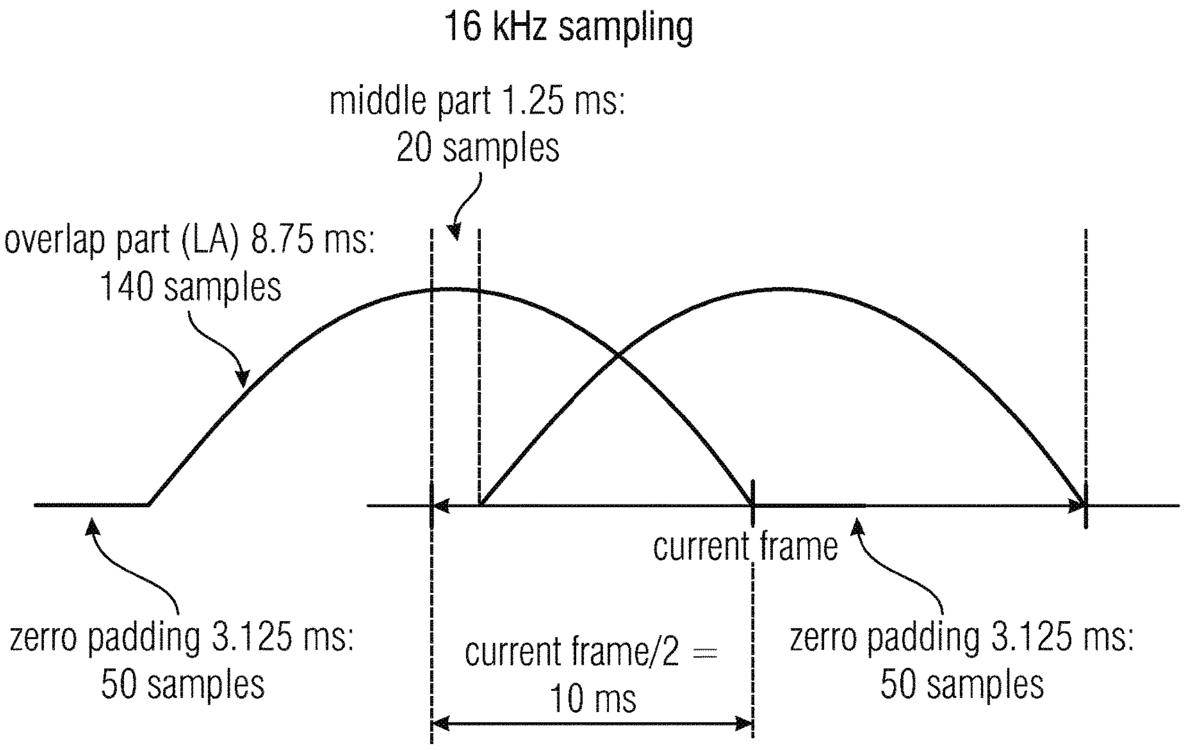
FIG. 7 illustrates a window scenario with low-overlapping sine windows with zero padding for a stereo time-frequency analysis and synthesis.
FIG. 8 illustrates a table showing the bit consumption of different parameter values.

Nevertheless, FIG. 8 illustrates a distribution of the parameters and the number of bands for which parameters are provided in a certain embodiment where there are, in contrast to FIG. 3, actually 12 bands.

As illustrated, the level parameter ILD is provided for each of 12 bands and is quantized to a quantization accuracy represented by five bits per band.

Furthermore, the narrowband alignment parameters IPD are only provided for the lower bands up to a border frequency of 2.5 kHz. Additionally, the inter-channel time difference or broadband alignment parameter is only provided as a single parameter for the whole spectrum but with a very high quantization accuracy represented by eight bits for the whole band.

Furthermore, quite roughly quantized stereo filling parameters are provided represented by three bits per band and not for the lower bands below 1 kHz since, for the lower bands, actually encoded side signal or side signal residual spectral values are included.

Figure 5:
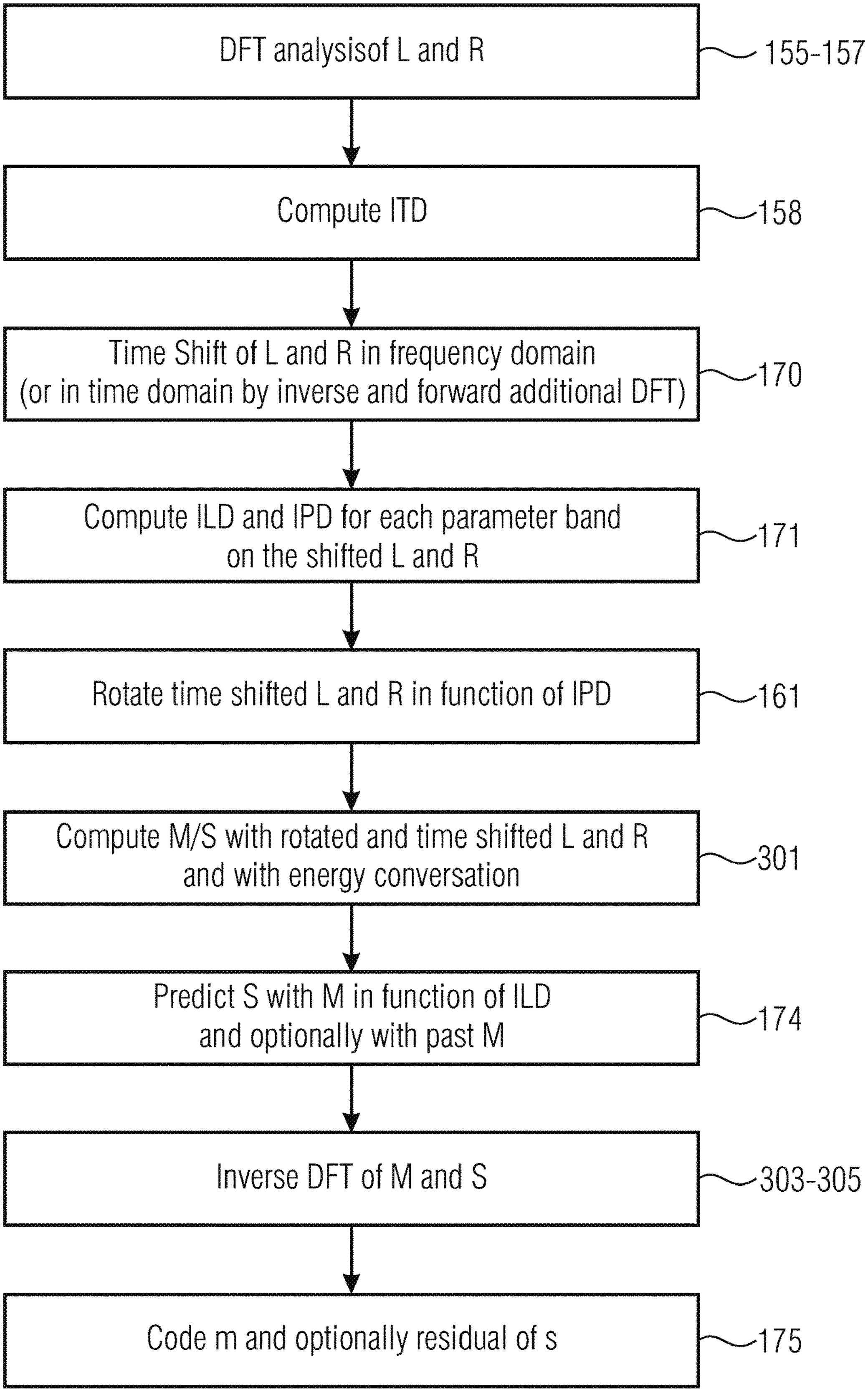
FIG. 5 illustrates a flowchart illustrating a further embodiment of procedures performed in the apparatus for encoding.

Subsequently, a processing on the encoder side is summarized with respect to FIG. 5. In a first step, a DFT analysis of the left and the right channel is performed. This procedure corresponds to steps 155 to 157 of FIG. 4*c*. In step 158, the broadband alignment parameter is calculated and, particularly, the broadband alignment parameter inter-channel time difference (ITD). As illustrated in 170, a time shift of L and R in the frequency domain is performed. Alternatively, this time shift can also be performed in the time domain. An inverse DFT is then performed, the time shift is performed in the time domain and an additional forward DFT is performed in order to once again have spectral representations subsequent to the alignment using the broadband alignment parameter.

ILD parameters, i.e., level parameters and phase parameters (IPD parameters), are calculated for each parameter band on the shifted L and R representations as illustrated at step 171. This step corresponds to step 160 of FIG. 4*c*, for example. Time shifted L and R representations are rotated as a function of the inter-channel phase difference parameters as illustrated in step 161 of FIG. 4*c* or FIG. 5. Subsequently, the mid and side signals are computed as illustrated in step 301 and, advantageously, additionally with an energy conversation operation as discussed later on. In a subsequent step 174, a prediction of S with M as a function of ILD and optionally with a past M signal, i.e., a mid-signal of an earlier frame is performed. Subsequently, inverse DFT of the mid-signal and the side signal is performed that corresponds to steps 303, 304, 305 of FIG. 4*d* in the embodiment.

In the final step 175, the time domain mid-signal m and, optionally, the residual signal are coded as illustrated in step 175. This procedure corresponds to what is performed by the signal encoder 400 in FIG. 1.

At the decoder in the inverse stereo processing, the Side signal is generated in the DFT domain and is first predicted from the Mid signal as:

$$\widehat{Side} = g \cdot \mathrm{Mid}$$

where g is a gain computed for each parameter band and is function of the transmitted Inter-channel Level Difference (ILDs).

The residual of the prediction Side−g·Mid can be then refined in two different ways:

By a secondary coding of the residual signal:

$$\widehat{Side} = g \cdot \mathrm{Mid} + g_{cod} \cdot (\mathrm{Side} - \widehat{g \cdot \mathrm{Mid}})$$

where $g_{cod}$ is a global gain transmitted for the whole spectrum

By a residual prediction, known as stereo filling, predicting the residual side spectrum with the previous decoded Mid signal spectrum from the previous DFT frame:

$$\widehat{Side} = g \cdot \mathrm{Mid} + g_{pred} \cdot \mathrm{Mid} \cdot z^{-1}$$

where $g_{pred}$ is a predictive gain transmitted per parameter band.

The two types of coding refinement can be mixed within the same DFT spectrum. In the embodiment, the residual coding is applied on the lower parameter bands, while residual prediction is applied on the remaining bands. The residual coding is in the embodiment as depict in FIG. 1 performs in MDCT domain after synthesizing the residual Side signal in Time Domain and transforming it by a MDCT. Unlike DFT, MDCT is critical sampled and is more suitable for audio coding. The MDCT coefficients are directly vector quantized by a Lattice Vector Quantization but can be alternatively coded by a Scalar Quantizer followed by an entropy coder. Alternatively, the residual side signal can be also coded in Time Domain by a speech coding technique or directly in DFT domain.

1. Time-Frequency Analysis: DFT

It is important that the extra time-frequency decomposition from the stereo processing done by DFTs allows a good auditory scene analysis while not increasing significantly the overall delay of the coding system. By default, a time resolution of 10 ms (twice the ms framing of the core coder) is used. The analysis and synthesis windows are the same and are symmetric. The window is represented at 16 kHz of sampling rate in FIG. 7. It can be observed that the overlapping region is limited for reducing the engendered delay and that zero padding is also added to counter balance the circular shift when applying ITD in frequency domain as it will be explained hereafter.

2. Stereo Parameters

Stereo parameters can be transmitted at maximum at the time resolution of the stereo DFT. At minimum it can be reduced to the framing resolution of the core coder, i.e. 20 ms. By default, when no transients is detected, parameters are computed every 20 ms over 2 DFT windows. The parameter bands constitute a non-uniform and nonoverlapping decomposition of the spectrum following roughly 2 times or 4 times the Equivalent Rectangular Bandwidths (ERB). By default, a 4 times ERB scale is used for a total of 12 bands for a frequency bandwidth of 16 kHz (32 kbps sampling-rate, Super Wideband stereo). FIG. 8 summarized an example of configuration, for which the stereo side information is transmitted with about 5 kbps.

3. Computation of ITD and Channel Time Alignment

The ITD are computed by estimating the Time Delay of Arrival (TDOA) using the Generalized Cross Correlation with Phase Transform (GCC-PHAT):

$$ITD = \mathrm{argmax}\left(IDFT\left(\frac{L_i(f)R_i^*(k)}{|L_i(f)R_i^*(k)|}\right)\right)$$

where L and R are the frequency spectra of the of the left and right channels respectively. The frequency analysis can be performed independently of the DFT used for the subsequent stereo processing or can be shared. The pseudo-code for computing the ITD is the following:

```
L =fft(window(l));
R =fft(window(r));
tmp = L . * conj( R );
sfm_L = prod(abs(L).^(1/length(L)))/(mean(abs(L))+eps);
sfm_R = prod(abs(R).^(1/length(R)))/(mean(abs(R))+eps);
sfm = max(sfm_L,sfm_R);
h.cross_corr_smooth = (1-sfm)*h.cross_corr_smooth+sfm*tmp;
tmp = h.cross_corr_smooth ./ abs( h.cross_corr_smooth+eps );
tmp = ifft( tmp );
tmp = tmp([length(tmp)/2+1:length(tmp) 1:length(tmp)/2+1]);
tmp_sort = sort( abs(tmp) );
thresh = 3 * tmp_sort( round(0.95*length(tmp_sort)) );
xcorr_time=abs(tmp(- ( h.stereo_itd_q_max - (length(tmp)-1)/2 - 1 ):- ( h.ste-
reo_itd_q_min - (length(tmp)-1)/2 - 1 )));
%smooth output for better detection
xcorr_time=[xcorr_time 0];
xcorr_time2=filter([0.25 0.5 0.25], 1,xcorr_time);
[m,i] = max(xcorr_time2(2:end));
if m > thresh
  itd = h.stereo_itd_q_max - i + 1;
else
  itd = 0;
end
```

FIG. 4*e* illustrates a flow chart for implementing the earlier illustrated pseudo code in order to obtain a robust and efficient calculation of an inter-channel time difference as an example for the broadband alignment parameter.

In block 451, a DFT analysis of the time domain signals for a first channel (I) and a second channel (r) is performed. This DFT analysis will typically be the same DFT analysis as has been discussed in the context of steps 155 to 157 in FIG. 5 or FIG. 4*c*, for example.

A cross-correlation is then performed for each frequency bin as illustrated in block 452.

Thus, a cross-correlation spectrum is obtained for the whole spectral range of the left and the right channels.

In step 453, a spectral flatness measure is then calculated from the magnitude spectra of L and R and, in step 454, the larger spectral flatness measure is selected. However, the selection in step 454 does not necessarily have to be the selection of the larger one but this determination of a single SFM from both channels can also be the selection and calculation of only the left channel or only the right channel or can be the calculation of weighted average of both SFM values.

In step 455, the cross-correlation spectrum is then smoothed over time depending on the spectral flatness measure.

Advantageously, the spectral flatness measure is calculated by dividing the geometric mean of the magnitude spectrum by the arithmetic mean of the magnitude spectrum. Thus, the values for SFM are bounded between zero and one.

In step 456, the smoothed cross-correlation spectrum is then normalized by its magnitude and in step 457 an inverse DFT of the normalized and smoothed cross-correlation spectrum is calculated. In step 458, a certain time domain filter is advantageously performed but this time domain filtering can also be left aside depending on the implementation but is advantageous as will be outlined later on.

In step 459, an ITD estimation is performed by peak-picking of the filter generalized cross-correlation function and by performing a certain thresholding operation.

If no peak above the threshold is obtained, then ITD is set to zero and no time alignment is performed for this corresponding block.

The ITD computation can also be summarized as follows. The cross-correlation is computed in frequency domain before being smoothed depending of the Spectral Flatness Measurement. SFM is bounded between 0 and 1. In case of noise-like signals, the SFM will be high (i.e. around 1) and the smoothing will be weak. In case of tone-like signal, SFM will be low and the smoothing will become stronger. The smoothed cross-correlation is then normalized by its amplitude before being transformed back to time domain. The normalization corresponds to the Phase-transform of the cross-correlation, and is known to show better performance than the normal cross-correlation in low noise and relatively high reverberation environments. The so-obtained time domain function is first filtered for achieving a more robust peak peaking. The index corresponding to the maximum amplitude corresponds to an estimate of the time difference between the Left and Right Channel (ITD). If the amplitude of the maximum is lower than a given threshold, then the estimated of ITD is not considered as reliable and is set to zero.

If the time alignment is applied in Time Domain, the ITD is computed in a separate DFT analysis. The shift is done as follows:

$$\begin{cases} r(n) = r(n + ITD) \text{ if } ITD > 0 \\ l(n) = l(n - ITD) \text{ if } ITD < 0 \end{cases}$$

An extra delay at encoder may be useful, which is equal at maximum to the maximum absolute ITD which can be handled. The variation of ITD over time is smoothed by the analysis windowing of DFT.

Alternatively the time alignment can be performed in frequency domain. In this case, the ITD computation and the circular shift are in the same DFT domain, domain shared with this other stereo processing. The circular shift is given by:

$$\begin{cases} L(f) = L(f)e^{-j2\pi f\frac{ITD}{2}} \\ R(f) = R(f)e^{+j2\pi f\frac{ITD}{2}} \end{cases}$$

Zero padding of the DFT windows is needed for simulating a time shift with a circular shift. The size of the zero padding corresponds to the maximum absolute ITD which can be handled. In the embodiment, the zero padding is split uniformly on the both sides of the analysis windows, by adding 3.125 ms of zeros on both ends. The maximum absolute possible ITD is then 6.25 ms. In A-B microphones setup, it corresponds for the worst case to a maximum distance of about 2.15 meters between the two microphones. The variation in ITD over time is smoothed by synthesis windowing and overlap-add of the DFT.

It is important that the time shift is followed by a windowing of the shifted signal. It is a main distinction with the conventional Binaural Cue Coding (BCC), where the time shift is applied on a windowed signal but is not windowed further at the synthesis stage. As a consequence, any change in ITD overtime produces an artificial transient/click in the decoded signal.

4. Computation of IPDs and Channel Rotation

The IPDs are computed after time aligning the two channels and this for each parameter band or at least up to a given ipd_max_band, dependent of the stereo configuration.

$$IPD[b] = \text{angle}\left(\sum_{k=band_{limits}[b]}^{band_{limits}[b+1]} L[k]R^*[k]\right)$$

IPDs is then applied to the two channels for aligning their phases:

$$\begin{cases} L'(k) = L(k)e^{-j\beta} \\ R'(k) = R(k)e^{j(IPD[b]-\beta)} \end{cases}$$

Where β=atan 2(sin($IPD_i$[b]), cos($IPD_i$[b])+c), $c=10^{ILD_i[b]/20}$ and b is the parameter band index to which belongs the frequency index k. The parameter β is responsible of distributing the amount of phase rotation between the two channels while making their phase aligned. β is dependent of IPD but also the relative amplitude level of the channels, ILD. If a channel has higher amplitude, it will be considered as leading channel and will be less affected by the phase rotation than the channel with lower amplitude.

5. Sum-Difference and Side Signal Coding

The sum difference transformation is performed on the time and phase aligned spectra of the two channels in a way that the energy is conserved in the Mid signal.

$$\begin{cases} M(f) = (L'(f) + R'(f)) \cdot a \cdot \sqrt{\frac{1}{2}} \\ S(f) = (L'(f) - R'(f)) \cdot a \cdot \sqrt{\frac{1}{2}} \end{cases}$$

where $$a = \sqrt{\frac{L'^2 + R'^2}{(L' + R')^2}}$$

is bounded between 1/1.2 and 1.2, i.e. −1.58 and +1.58 dB. The limitation avoids artefact when adjusting the energy of M and S. It is worth noting that this energy conservation is less important when time and phase were beforehand aligned. Alternatively the bounds can be increased or decreased.

The side signal S is further predicted with M:

$$S'(f) = S(f) - g(\text{ILD})M(f)$$

where $$g(ILD) = \frac{c-1}{c+1},$$

where $c=10^{ILD_i[b]/20}$. Alternatively the optimal prediction gain g can be found by minimizing the Mean Square Error (MSE) of the residual and ILDs deduced by the previous equation.

The residual signal S'(f) can be modeled by two means: either by predicting it with the delayed spectrum of M or by coding it directly in the MDCT domain in the MDCT domain.

6. Stereo Decoding

The Mid signal X and Side signal S are first converted to the left and right channels L and R as follows:

$$L_i[k] = M_i[k] + gM_i[k], \text{ for band\_limits}[b] \le k < \text{band\_limits}[b+1],$$

$$R_i[k] = M_i[k] - gM_i[k], \text{ for band\_limits}[b] \le k < \text{band\_limits}[b+1],$$

where the gain g per parameter band is derived from the ILD parameter:

$$g = \frac{c-1}{c+1},$$

where $c=10^{ILD_i[b]/20}$.

For parameter bands below cod_max_band, the two channels are updated with the decoded Side signal:

$$L_i[k] = L_i[k] + cod\_\text{gain}_i \cdot S_i[k], \text{ for } 0 \le k < \text{band\_limits}[cod\_\text{max\_band}],$$

$$R_i[k] = R_i[k] - cod\_\text{gain}_i \cdot S_i[k], \text{ for } 0 \le k < \text{band\_limits}[cod\_\text{max\_band}],$$

For higher parameter bands, the side signal is predicted and the channels updated as:

$$L_i[k] = L_i[k] + cod\_\text{pred}_i[b] \cdot M_{i-1}[k], \text{ for band\_limits}[b] \le k < \text{band\_limits}[b+1],$$

$$R_i[k] = R_i[k] - cod\_\text{pred}_i[b] \cdot M_{i-1}[k], \text{ for band\_limits}[b] \le k < \text{band\_limits}[b+1],$$

Finally, the channels are multiplied by a complex value aiming to restore the original energy and the inter-channel phase of the stereo signal:

$$L_i[k] = a \cdot e^{j2\pi\beta} \cdot L_i[k]$$

$$R_i[k] = a \cdot e^{j2\pi\beta - IPD_i[b]} \cdot R_i[k]$$

where $$a = \sqrt{2 \cdot \frac{\sum_{k=band\_limits[b]}^{band\_limits[b+1]} M_i^2[k]}{\sum_{k=band\_limits[b]}^{band\_limits[b+1]-1} L_i^2[k] + \sum_{k=band\_limits[b]}^{band\_limits[b+1]-1} R_i^2[k]}}$$

where a is defined and bounded as defined previously, and where β=atan 2(sin($IPD_i$[b]), cos($IPD_i$[b])+c), and where atan 2(x,y) is the four-quadrant inverse tangent of x over y.

Finally, the channels are time shifted either in time or in frequency domain depending of the transmitted ITDs. The time domain channels are synthesized by inverse DFTs and overlap-adding.

Specific features of the invention relate to the combination of spatial cues and sum-difference joint stereo coding. Specifically, the spatial cues IDT and IPD are computed and applied on the stereo channels (left and right). Furthermore, sum-difference (M/S signals) are calculated and advantageously a prediction is applied of S with M.

On the decoder-side, the broadband and narrowband spatial cues are combined together with sum-different joint stereo coding. In particular, the side signal is predicted with the mid-signal using at least one spatial cue such as ILD and an inverse sum-difference is calculated for getting the left and right channels and, additionally, the broadband and the narrowband spatial cues are applied on the left and right channels.

Advantageously, the encoder has a window and overlap-add with respect to the time aligned channels after processing using the ITD. Furthermore, the decoder additionally has a windowing and overlap-add operation of the shifted or de-aligned versions of the channels after applying the inter-channel time difference.

The computation of the inter-channel time difference with the GCC-Phat method is a specifically robust method.

The new procedure is advantageous known technology since is achieves bit-rate coding of stereo audio or multichannel audio at low delay. It is specifically designed for being robust to different natures of input signals and different setups of the multichannel or stereo recording. In particular, the present invention provides a good quality for low bit rate stereo speech coding.

The procedures find use in the distribution of broadcasting of all types of stereo or multichannel audio content such as speech and music alike with constant perceptual quality at a given low bit rate. Such application areas are a digital radio, internet streaming or audio communication applications.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded image signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Patent application. "Apparatus and Method for Estimating an Inter-Channel Time Difference." International Application Number PCT/EP2017/051214.

[2] Knapp, Charles, and Glifford Carter. "The generalized correlation method for estimation of time delay." IEEE Transactions on Acoustics, Speech, and Signal Processing 24.4 (1976): 320-327.

[3] Zhang, Cha, Dinei Florêncio, and Zhengyou Zhang. "Why does PHAT work well in low-noise, reverberative environments?" Acoustics, Speech and Signal Processing, 2008. ICASSP 2008. IEEE International Conference on. IEEE, 2008.

[4] Rabinkin, Daniel V., et al. "DSP implementation of source location using microphone arrays." Advanced signal processing algorithms, architectures, and implementations VI. Vol. 2846. International Society for Optics and Photonics, 1996.

[5] Shen, Miao, and Hong Liu. "A modified cross power-spectrum phase method based on microphone array for acoustic source localization." Systems, Man and Cybernetics, 2009. SMC 2009. IEEE International Conference on. IEEE, 2009.

[6] 3GPP TS 26.445; Codec for Enhanced Voice Services (EVS); Detailed algorithmic description.

The invention claimed is:

1. An apparatus for estimating an inter-channel time difference between a first channel audio signal and a second channel audio signal of a stereo audio signal or a multi-channel audio signal comprising more channel audio signals than the first channel audio signal and the second channel audio signal, comprising:

a signal analyzer for estimating a signal characteristic of the first channel audio signal or the second channel audio signal or the first channel audio signal and the second channel audio signals or a signal derived from the first channel audio signal or the second channel audio signal;

a calculator for calculating a cross-correlation spectrum for a time block from the first channel audio signal in the time block and the second channel audio signal in the time block;

a weighter for weighting a smoothed or non-smoothed cross-correlation spectrum to acquire a weighted cross correlation spectrum using a first weighting procedure or using a second weighting procedure depending on the signal characteristic estimated by the signal analyzer, wherein the first weighting procedure is different from the second weighting procedure, wherein the first weighting procedure comprises a weighting so that an amplitude of the smoothed or non-smoothed cross-correlation spectrum is normalized and a phase of the smoothed or non-smoothed cross-correlation spectrum is maintained, and wherein the second weighting procedure comprises a weighting factor derived from the smoothed or non-smoothed cross-correlation spectrum using a power operation comprising a power being lower than 1 and greater than 0 or a log function; and a processor for processing the weighted cross-correlation spectrum to acquire the inter-channel time difference.

2. The apparatus of claim 1, wherein the signal analyzer is configured as a noise estimator for estimating, as the signal estimate, a noise level of the first channel audio signal or the second channel audio signal or the first channel audio signal and the second channel audio signal or a signal derived from the first channel audio signal or the second channel audio signal, and wherein a first signal characteristic is a first noise level and a second signal characteristic is a second noise level, wherein the second signal characteristic is different from the first signal characteristic, or wherein the signal analyzer is configured to perform a speech/music analysis, an interfering-talker analysis, a background music analysis, a clean speech analysis or any other signal analysis in order to determine, whether the first channel audio signal or the second channel audio signal comprises a first signal characteristic or a second signal characteristic, wherein the second signal characteristic is different from the first signal characteristic.

3. The apparatus of claim 2, wherein the noise estimator is configured to estimate, as the signal characteristic, a level of a background noise or is configured to smooth an estimated noise level over time or is configured to use an IIR smoothing filter, or wherein the noise estimator further comprises a signal activity detector for classifying the time block as active or inactive, wherein the noise estimator is configured to compute a signal level using one or more active time blocks, or wherein the noise estimator is configured to signal a high background noise level, when a signal to noise ratio is below a threshold, the threshold being in a range between 45 to 25 dB.

4. The apparatus of claim 1, wherein the second weighting procedure comprises a weighting so that the amplitude of the smoothed or non-smoothed cross-correlation spectrum is normalized and the phase of the smoothed or non-smoothed cross-correlation spectrum is maintained and additionally comprises the weighting factor derived from the smoothed or non-smoothed cross-correlation spectrum using the power operation comprising the power, the power being between 0.79 and 0.82.

5. The apparatus of claim 1, wherein the processor is configured to perform the inter-channel time difference determination by performing a peak searching or peak picking operation within a time-domain representation determined from the smoothed cross-correlation spectrum.

6. The apparatus of claim 1, further comprising:

a spectral characteristic estimator for estimating a spectral characteristic of a spectrum of the first channel audio signal or the second channel audio signal for the time block; and a smoothing filter for smoothing the cross-correlation spectrum over time using the spectral characteristic to acquire a smoothed cross-correlation spectrum, and wherein the weighter is configured for weighting the smoothed cross-correlation spectrum, wherein the spectral characteristic estimator is configured to determine, as the spectral characteristic, a noisiness or a tonality of the spectrum; and wherein the smoothing filter is configured to apply a stronger smoothing over time with a first smoothing degree in case of a first less noisy characteristic or a first more tonal characteristic, or to apply a weaker smoothing over time with a second smoothing degree in case of a second more noisy characteristic or a second less tonal characteristic, wherein the first smoothing degree is greater than the second smoothing degree, and wherein the first noisy characteristic is less noisy than the second noisy characteristic, or the first tonal characteristic is more tonal than the second tonal characteristic, or wherein the spectral characteristics estimator is configured to calculate, as the spectral characteristic, a first spectral flatness measure of a spectrum of the first channel audio signal and a second spectral flatness measure of a second spectrum of the second channel audio signal, and to determine the spectral characteristic from the first flatness measure and the second spectral flatness measure by selecting a maximum value from the first spectral flatness measure and the second spectral flatness measure, by determining a weighted average or an unweighted average between the first spectral flatness measure and the second spectral flatness measures, or by selecting a minimum value from the first spectral flatness measure and the second spectral flatness measure, or wherein the smoothing filter is configured to calculate a smoothed cross-correlation spectrum value for a frequency by a weighted combination of the cross-correlation spectrum value for the frequency from the time block and a cross-correlation spectral value for the frequency from at least one past time block, wherein weighting factors for the weighted combination are determined by the spectral characteristic.

7. The apparatus of claim 1, wherein the processor is configured to determine a valid range and an invalid range within a time-domain representation derived from the weighted smoothed or non-smoothed cross-correlation spectrum, wherein at least one maximum peak within the invalid range is detected and compared to a maximum peak within the valid range, wherein the inter-channel time difference is only determined, when the maximum peak within the valid range is greater than at least one maximum peak within the invalid range.

8. The apparatus of claim 1, wherein the processor is configured to perform a peak search operation within a time-domain representation derived from the smoothed cross-correlation spectrum, to determine a variable threshold from the time-domain representation; and to compare a peak to the variable threshold, wherein the inter-channel time difference is determined as a time lag associated with the peak being in a predetermined relation to the variable threshold.

9. The apparatus of claim 8, wherein the processor is configured to determine the variable threshold as a value being equal to an integer multiple of a value among a largest 10% portion of values of the time-domain representation.

10. The apparatus of claim 1, wherein the processor is configured to determine a maximum peak amplitude in each subblock of a plurality of subblocks of a time-domain representation derived from the smoothed cross-correlation spectrum, wherein the processor is configured to calculate a variable threshold based on a mean peak magnitude derived from the maximum peak magnitudes of the plurality of subblocks, and wherein the processor is configured to determine the inter-channel time difference as a time lag value corresponding to a maximum peak of the plurality of subblocks being greater than the variable threshold.

11. The apparatus of claim 10, wherein the processor is configured to calculate the variable threshold by a multiplication of the mean peak magnitude by a value, the mean peak magnitude being determined as an average of the maximum peak magnitudes of the plurality of subblocks, wherein the value is determined by an SNR (signal to noise ratio) characteristic of the first channel audio signal and the second channel audio signal, wherein a first value is associated with a first SNR value and a second value is associated with a second SNR value, wherein the first value is greater than the second value, and wherein the first SNR value is greater than the second SNR value.

12. The apparatus of claim 1, wherein the apparatus is configured for performing a storage or a transmission of the estimated inter-channel time difference, or for performing a stereo or multi-channel processing or encoding of the first channel audio signal and the second channel audio signal using the estimated inter-channel time difference, or for performing a time alignment of the first channel audio signals and the second channel audio signal using the inter-channel time difference, or for performing a time difference of arrival estimation using the estimated inter-channel time difference, or for performing a time difference of arrival estimation using the inter-channel time difference for the determination of a speaker position in a room with two microphones and a known microphone setup, or for performing a beamforming using the estimated inter-channel time difference, or for performing a spatial filtering using the estimated inter-channel time difference, or for performing a foreground or background decomposition using the estimated inter-channel time difference, or for performing a location operation of a sound source using the estimated inter-channel time difference, or for performing a location of a sound source using the estimated inter-channel time difference by performing an acoustic triangulation based on time differences between the first audio channel signal and the second channel audio signal or the first channel audio signal, the second channel audio signal and at least one additional audio signal.

13. The apparatus of claim 1, wherein the signal analyzer is configured to determine a noise level as the signal characteristic, and wherein the weighter is configured to select either the first or the second weighting procedure depending on the noise level.

14. A method of estimating an inter-channel time difference between a first channel audio signal and a second channel audio signal of a stereo audio signal or a multi-channel audio signal comprising more channel audio signals than the first channel audio signal and the second channel audio signal, the method comprising:

estimating a signal characteristic of the first channel audio signal or the second channel audio signal or the first channel audio signal and the second channel audio signal or a signal derived from the first channel audio signal or the second channel audio signal;

calculating a cross-correlation spectrum for a time block from the first channel audio signal in the time block and the second channel audio signal in the time block;

weighting a smoothed or non-smoothed cross-correlation spectrum to acquire a weighted cross correlation spectrum using a first weighting procedure or using a second weighting procedure depending on a signal characteristic estimated, wherein the first weighting procedure is different from the second weighting procedure, wherein the first weighting procedure comprises a weighting so that an amplitude of the smoothed or non-smoothed cross-correlation spectrum is normalized and a phase of the smoothed or non-smoothed cross-correlation spectrum is maintained, and wherein the second weighting procedure comprises a weighting factor derived from the smoothed or non-smoothed cross-correlation spectrum using a power operation comprising a power being lower than 1 and greater than 0 or a log function; and processing the weighted cross-correlation spectrum to acquire the inter-channel time difference.

15. A non-transitory digital storage medium having stored thereon a computer program for performing a method of estimating an inter-channel time difference between a first channel audio signal and a second channel audio signal of a stereo audio signal or a multi-channel audio signal comprising more channel audio signals than the first channel audio signal and the second channel audio signal, the method comprising:

estimating a signal characteristic of the first channel audio signal or the second channel audio signal or the first channel audio signal and the second channel audio signal or a signal derived from the first channel audio signal or the second channel audio signal;

calculating a cross-correlation spectrum for a time block from the first channel audio signal in the time block and the second channel audio signal in the time block;

weighting a smoothed or non-smoothed cross-correlation spectrum to acquire a weighted cross correlation spectrum using a first weighting procedure or using a second weighting procedure depending on a signal characteristic estimated, wherein the first weighting procedure is different from the second weighting procedure, wherein the first weighting procedure comprises a weighting so that an amplitude of the smoothed or non-smoothed cross-correlation spectrum is normalized and a phase of the smoothed or non-smoothed cross-correlation spectrum is maintained, and wherein the second weighting procedure comprises a weighting factor derived from the smoothed or non-smoothed cross-correlation spectrum using a power operation comprising a power being lower than 1 and greater than 0 or a log function; and processing the weighted cross-correlation spectrum to acquire the inter-channel time difference, when said computer program is run by a computer.

* * * * *